(12) United States Patent
Besecker et al.

(10) Patent No.: US 8,104,671 B2
(45) Date of Patent: Jan. 31, 2012

(54) STORE SOLUTIONS

(75) Inventors: Bret Joseph Besecker, Safety Harbor, FL (US); Jay Parsons, Tampa, FL (US); Anantha Narayanan Ramachandran, Clearwater, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 979 days.

(21) Appl. No.: 12/056,490

(22) Filed: Mar. 27, 2008

(65) Prior Publication Data

US 2009/0026255 A1 Jan. 29, 2009

Related U.S. Application Data

(60) Provisional application No. 60/943,462, filed on Jun. 12, 2007.

(51) Int. Cl.
*G06F 17/00* (2006.01)
*G06F 19/00* (2011.01)
*G07B 15/02* (2011.01)
*G06Q 30/00* (2006.01)
*G06K 7/10* (2006.01)
*G06K 19/06* (2006.01)

(52) U.S. Cl. ........ 235/375; 235/383; 235/384; 235/385; 235/462.01; 705/14.1

(58) Field of Classification Search ............... 235/383, 235/384, 385, 462.01, 487; 705/14, 14.25; 340/5.91
See application file for complete search history.

(56) References Cited

U.S. PATENT DOCUMENTS

| | | | |
|---|---|---|---|
| 3,792,437 A * | 2/1974 | Blumenthal et al. | 340/5.91 |
| 5,091,634 A * | 2/1992 | Finch et al. | 235/375 |
| 5,974,396 A | 10/1999 | Anderson et al. | |
| 6,047,269 A | 4/2000 | Biffar | |
| 6,230,143 B1 | 5/2001 | Simmons et al. | |
| 6,282,516 B1 * | 8/2001 | Giuliani | 705/14.25 |
| 6,484,939 B1 * | 11/2002 | Blaeuer | 235/383 |
| 6,679,421 B2 * | 1/2004 | Shin et al. | 235/375 |
| 6,684,195 B1 | 1/2004 | Deaton et al. | |
| 6,766,301 B1 | 7/2004 | Daniel et al. | |
| 6,886,745 B2 * | 5/2005 | Berrube et al. | 235/375 |
| 7,013,286 B1 | 3/2006 | Aggarwal et al. | |
| 7,195,151 B2 * | 3/2007 | Licciardello et al. | 235/375 |
| 2002/0038239 A1 * | 3/2002 | Hasegawa et al. | 705/14 |
| 2002/0077907 A1 * | 6/2002 | Ukai et al. | 705/14 |
| 2003/0093314 A1 * | 5/2003 | Leung et al. | 705/14 |
| 2003/0146278 A1 * | 8/2003 | Collins et al. | 235/383 |

(Continued)

OTHER PUBLICATIONS

Apr. 30, 2008, Screen shots from Wrenchman Inc. website, http://www.wrenchman.com.
Aug. 12, 2008, Written Opinion of International Search Authority for PCT/US2008/058460.

(Continued)

*Primary Examiner* — Thien Mai
(74) *Attorney, Agent, or Firm* — Pillsbury Winthrop Shaw Pittman LLP

(57) ABSTRACT

Disclosed are systems and methods that time correlate input at a point of entry of consumer data of least two identifications for products, prescriptions, vouchers, or codes, uses positive correlation determinations for triggering output of predetermined information. The time correlation of identifications may be used to build a time correlation database, and thereafter use that database for targeted communications. Related inventions include an intelligent Y cable or the like to filter data transmitted from a scanner at a point of entry of consumer data, and a novel POS CS configured to receive bar codes that would otherwise cause the POS CS to enter an error condition.

14 Claims, 9 Drawing Sheets

U.S. PATENT DOCUMENTS

2004/0030600 A1     2/2004   Lacroix
2004/0050941 A1*    3/2004   Hanyu et al. .................. 235/487
2005/0289006 A1    12/2005   Cividini
2006/0208073 A1*    9/2006   Blaeuer ........................ 235/383

OTHER PUBLICATIONS

Aug. 12, 2008, International Search Report for PCT/US2008/058460.

* cited by examiner

LMCS Database
Voucher Triggering Table 300

| Triggering Product ID | Triggered Voucher ID | Triggered Telephone Code |
|---|---|---|
| 123456 | 11112301 | 1231 |
| 123457 | 11112302 | 1232 |
| 123458 | 11112303 | 1233 |
| 123459 | 11112304 | 1324 |
| 123450 | 11112305 | 1235 |

FIG. 3

Coupon Triggering Table 400

| Input Voucher ID | Product ID | Coupon Data 1 |
|---|---|---|
| 11112301 | 123456 | 1231 |
| 11112301 | 123466 | 1231 |
| 11112301 | 123476 | 1231 |
| 11112301 | 121111 | 1231 |
| 11112302 | 123457 | 1232 |
| 11112302 | 111111 | 1232 |
| 11112302 | 113118 | 1232 |
| 11112303 | 111111 | 1233 |

FIG. 4

Coupon Triggering Table 500

| | Return Telephone Code 510 | Product ID 520 | Coupon Data 2 530 |
|---|---|---|---|
| 540 | XXXXX1231 | 123456 | 5161 |
| 541 | XXXXX1231 | 123466 | 5161 |
| 542 | XXXXX1231 | 123476 | 1563 |
| 543 | XXXXX1231 | 121111 | 6263 |
| 544 | XXXXX1232 | 123457 | 6678 |
| 545 | XXXXX1232 | 111111 | 6584 |
| 546 | XXXXX1232 | 113118 | 2496 |
| 547 | XXXXX1233 | 111111 | 2218 |

FIG. 5

Scanning Log Table 600

| Record 605 | Time of Receipt 610 | Identification (Product or Voucher) 620 |
|---|---|---|
| 3016 | 4:00:57 | 123456 |
| 3015 | 4:00:51 | 11112301 |
| 3014 | 4:00:49 | 123457 |
| 3013 | 4:00:42 | 123458 |
| 3012 | 4:00:38 | 114966 |
| 3011 | 4:00:26 | 122333 |
| 3010 | 4:00:21 | 122334 |
| 3009 | 4:00:07 | 12111 |
| 3008 | 4:00:00 | 11112302 |
| 3007 | 3:59:54 | 211222 |
| 3006 | 3:59:49 | 213400 |
| 3005 | 3:59:44 | 212212 |
| 3004 | 3:59:40 | 234567 |
| 3003 | 3:59:00 | 215666 |
| 3002 | 3:58:55 | 333111 |
| 3001 | 3:58:42 | 123456 |
| 3000 | 3:58:40 | 123457 |

+50 Seconds 630
Time Correlation Pointer 650
−45 Seconds 640
660

FIG. 6

Coupon Print File Lookup Table 700

| Coupon Identification 710 | Coupon Print File 720 |
|---|---|
| 1231 | 1231.prt |
| 1232 | 1232.prt |
| 5161 | 5161.prt |
| 5163 | 5163.prt |
| ⋮ | ⋮ |

FIG. 7

Output Coupon Table 800

| Coupon ID 810 | Voucher ID or Return Telephone Code ID 820 | Product ID 830 | Time of Receipt 840 | Final Output Time 850 | Final Output Flag 860 | Final Output Status 870 |
|---|---|---|---|---|---|---|
| 1232 | 1112302 | 123457 | 4:00:49 | 4:01:34 | Y | |
| ⋮ | ⋮ | ⋮ | ⋮ | ⋮ | ⋮ | ⋮ |

STORE SOLUTIONS

CROSS REFERENCE TO RELATED APPLICATIONS

This application claims priority to provisional application having application No. 60/943,462, and filing date Jun. 12, 2007, titled "Convenience Store Solutions". The disclosure of 60/943,462 is incorporated herein by reference.

BACKGROUND

ID is an acronym for IDentification.

CID is an acronym for Consumer IDentification. CID means a unique code. Typically, a CID is associated with a particular consumer or a purchase history.

CS is an acronym for Computer System.

POS is an acronym for Point Of Sale.

LM is an acronym for Local Marketing.

CM is an acronym for Central Marketing.

I/O is an acronym for Input and Output.

RFID is an acronym for Radio Frequency Identification.

A POS CS is a computerized system including structure for performing at least the following functions: receiving transaction information at a POS including item identifier, price, calculating transaction totals, logging POS transactions, and storing a list of store inventory and inventory item prices.

Some POS CSs are designed to sore and utilize standardized manufacturer coupon files. These files for example contain in association with one another, coupon identifier, which may appear on a coupon in a bar code format, discount amount, and product identification. As a result, a properly programmed POS CS can validate a coupon received during a transaction (by determining a product associated with the coupon is being purchased), and if found valid, discount the transaction by the discount amount. Some POS CS may not be capable to perform the validation step, in which case they automatically apply the discount amount associated with a coupon when the coupon ID is entered into the POS CS during a transaction. Other POS CSs lack any coupon files and in these systems the store clerks can manually enter the discount identified on the coupon, and the coupon identification code. Most POS CSs are designed to receive data from a scanner. However, scanner data output formats and the POS CS data input formats vary between scanner models and POS CS models.

Use of paper coupons requires a follow on accounting reconciliation step wherein the paper coupons amounts owed by each debtor coupon sponsor (such as manufacturers) to each coupon creditor (such as retail store in which the coupon was redeemed) are determined and payment thereafter implemented.

Preferably, the POS CS can perform a host of other functions, including tracking changes in tracking changes in inventory, providing reports on sales and inventory. accounting in transactions for taxes, generating orders for additional merchandise, transmitting data (reports, logs, inventory, sales, etc.) to a centralized retail chain store server. A POS CS may also be able to perform marketing and security functions.

A convenience store herein means a retail store having floor space of 800-5000 square feet, 500 to 2000 Stock Keeping Units ("SKUs"), and that sells packaged goods.

Convenience stores typically have a POS CS that includes only a single POS terminal. A POS terminal is a location where there are devices for data input and data output, such as a keyboard, a monitor, a printer, and a bar code scanner. Convenience stores each sell on average around a million dollars of non packaged goods annually. Convenience store transactions are characterized by relatively low total purchases per transaction, averaging $5-6 dollars. The majority of convenience stores purchase transactions are paid for using currency (cash). The average time a consumer spends waiting in line and completing a transaction in a convenience store is about one minute. Roughly 50 percent all revenue in convenience stores derives from tobacco sales, and 17 percent from beverage sales. The convenience store market is highly fragmented. Even chain stores such as "7-11" are often franchises in which the franchiser store control of store equipment and procedures, such as which POS CS to use, is not absolute.

Some stores, such as Subway and Ukrops offer promotions by transmitting them to cellular telephone numbers of those customers that have asked for such transmissions.

A convenience store purchase transaction (or purchase transaction, or just transaction) herein means a single exchange of cash or credit for purchase of one or more items for sale in a convenience store.

A purchase history means a collection of data for purchase transactions (including for example in each purchase transaction product identifications and quantities for items of products purchased, and date of transaction), of plural purchases, in which each transaction is also associated with a CID. A POS CS determines what product identifiers are in a particular purchase transaction by logging an end of transaction signal. The end of transaction signal, or tender signal, may be a signal in the POS CS the store clerk generated by pressing a key on a keyboard of the POS CS. A consumer's purchase history is a collection of such data in association with a unique CID so that the product identifiers and dates of their purchase may be analyzed for subsequent targeting of communications to the customer having that CID when that customer's CID is subsequently recognized at the POS. See for example U.S. Pat. No. 6,795,809 to O'Brien disclosing that concept.

A targeted offer is an offer limited to association with one or more people or logical address that meet certain targeting criteria, such that certain other people or logical addresses are not associated with the offer.

A purchase incentive offer is an offer to use a purchase incentive, in order to receive a benefit associated with the purchase, such as a discount.

A coupon is a printed purchase incentive offer that specifies entitlement to a particular benefit, usually a discount, contingent upon a particular action, typically purchasing items of one or more specified products.

A targeted incentive offer is an incentive offer that targeted.

Product information data means data providing information about one or more products.

Targeting criteria may be purchase of one or more items of a particular product, or of plural products, or failure to purchase an items of one or more products, or any combination of purchase and non purchase of plural products, during one or more prior visits or a current visit (or time intervals prior to or concurrent with the current time) to a retail store or online shopping sessions with a Web site.

A targeted incentive offer may for example offer a discount contingent on future behavior. That behavior may be a consumer in the future purchasing another item of a product the consumer is in the process of purchasing or has just purchased, or if the consumer in the future purchases an item of a product competing with the product the consumer is purchasing or has just purchased. A targeted incentive offer may for example offer to a consumer a discount for a subsequent purchase of some item logically heuristically related to products of the consumer's prior or current purchases.

SUMMARY OF THE INVENTION

In their prior tests of systems for automatically providing targeted incentive offers in convenience stores, the inventors observed two problems unique to convenience stores. First, substantial coupon redemption fraud by store clerks. Second, ineffective services for accounting for redeemed purchase incentives. Thus, the inventors recognized any system for automatically providing targeted incentive offers in convenience stores would have to solve these problems. The system and methods described below do that.

In their prior tests and surveys of the market, the inventors recognized that convenience stores implemented many different POS CSs and many different versions of the same generic POS CS. As a consequence, the inventors recognized that only systems and methods generic to existing installed POS systems installed in convenience stores would be economically feasible. The preferred embodiments described below are generic to POS CSs installed in convenience stores.

The inventors recognized that there was a high turnover rate of the convenience store clerks that operate convenience store POS terminals. POS terminals are used by store clerks for entering purchase transaction data, processing purchase transactions, and redeeming accepted purchase incentive offers. As a consequence, the inventors recognized that only systems and methods requiring minimal training of store clerks would be economically feasible. The system and methods described below require minimal training of store clerks.

The inventors also recognized that product identification of product items in the form of bar codes on product packaging, and the format for optical scanners to transmit bar code identifications to a POS CS, were well known.

OBJECTS OF THE INVENTION

It is a general object to provide hardware, software, and operational procedures that facilitate providing targeted product information data to customers of retail stores.

It is a general object to provide hardware, software, and operational procedures that facilitate providing and redeeming purchase incentive others for purchase of certain products in retail stores while deterring fraud and providing for detection of fraud.

It is a general object of the invention to provide hardware, software, and operational procedures that facilitate providing and redeeming purchase incentive offers for transactions in retail stores that require no modification to existing POS CSs in stores.

It is a general object to provide hardware, software, and operational procedures whose cost of installation and operational complexity are low enough so that its benefits outweigh its costs.

It should be noted that the disclosed inventions have utility in any retail store, not just convenience stores.

These and other objects are provided by systems and methods that time correlate input at a point of entry of consumer data of one or more identifications with one or more predetermined time periods. The identifications may be for products, prescriptions, vouchers, or other identification codes. A positive time correlation determination is at least one step that is required for triggering output of product information data, such as marketing material, promotions, or coupons. The triggering may also require determining that the two time correlated identifications also have a predetermined association. This process minimizes print or transmission of information to only targeted information. It also, in the context of purchase incentive offers, substantially eliminates fraudulent purchase incentive redemption. communications.

These and other objects are provided by systems and methods that use time of receipt of scanned bar codes and heuristic data indicating when actual transactions end to reorganize logged scan data into assumed transaction records, based upon time of receipt, and to use the assumed transaction data and targeting criteria and rules to determine when and for whom to provide targeted information such as product information and vouchers. Moreover, the time correlation of identifications may be used to build a time correlation database, and thereafter use that database and targeting criteria for targeting and customizing prospective communications to individuals.

The inventors also disclose use of a Y cable or the like to transmit data transmitted from a scanner at a point of entry of consumer data to both a POS CS and a LM CS and an additional scanner included with the LM CS for scanning voucher codes; or an intelligent Y cable or the like to filter data transmitted from a scanner at a point of entry of consumer data to a POS CS so that the POS CS does not receive certain scanned voucher codes. The intelligent Y cable enables use of bar codes to be scanned by the scanner that would otherwise cause the POS CS to enter an error condition, thereby expanding the data input and output capabilities associated with the point of entry of consumer data, without requiring modification to the pre existing POS system, other than replacement of the original scanner cable. The inventors also disclose alternatives wherein the POS CS is configured to receive and handle scanned voucher codes without entering and remaining in an error condition.

Preferably, LM CS only prints the voucher after it determining that a purchase transaction triggering printing for the voucher is likely to have ended.

In some embodiments for delivering coupons, the LM CS prints a voucher containing a voucher ID code only depending upon receipt of one or more product IDs required to print the voucher.

In a first class of implementations for delivering coupons, the LM CS responds to receipt of a voucher code, with no additional requirements, by printing a corresponding coupon either immediately or after some specified or calculated delay time.

In a second class of implementations for delivering coupons, the LM CS time correlates time of receipt of a voucher ID code associated with a product ID code, with time of receipt of the associated product ID code, and the LM CS prints a coupon in response thereto only if it receives both the voucher ID code and the associated product ID code within a time determined by the LM CS to likely be during one purchase transaction.

Given the broad nature of the invention, a host of other related novel inventions are disclosed throughout the specification.

A first aspect comprises a method and system for building a time correlation history database comprising a targeting CS comprising at least one targeting CS central processing unit, at least one targeting CS memory, at least one targeting CS input, and at least one targeting CS output;

wherein said at least one targeting CS input is configured to receive at least personal device addresses and product identifiers; wherein said at least one targeting CS memory comprises a time correlation log; wherein said time correlation log is configured to store time of receipt of each one of said at least one personal device addresses in association with the corresponding one of said personal device address, and to store time of receipt of each one of said product identifiers in association with the corresponding one of said product identifiers;

wherein said at least one targeting CS memory comprises a time correlation history data structure for storing in association with one another, at least (1) a personal device address, (2) a personal device address time of receipt of said personal device address, and (3) one or more product identifiers each having a product identifier time of receipt correlated in time with said personal device address time of receipt; and wherein said targeting CS is configured to process data in said time correlation log to populate said time correlation history data structure by determining if time of receipt of a product identifier in said time correlation log is within time of receipt a personal device address time of receipt in said time correlation log.

Aspects depending on the first aspect include: (2) wherein said at least one targeting CS memory comprises a targeting rules data structure storing targeting rules for identifying personal device addresses to which to send targeting signals by applying targeting rules to data in said time correlation history data structure; wherein said targeting CS is configured to process data in said time correlation history data structure using a first targeting rule stored in said targeting rules data structure to define a first set of targeted personal device addresses selected from personal device addresses stored in said time correlation history data structure; and wherein said targeting CS is configured to transmit a targeted signal in association with each one of said first set of targeted personal device addresses; (3) wherein said personal device address is a cellular telephone number or an email address; (4) wherein said targeting CS comprises a LM CS and a CM CS and a network connection enabling them to communicate with one another.

A second aspect comprises a method and system, comprising:

a LM CS, said LM CS including; a LM CS central processing unit for processing instructions and data; a LM CS memory for storing data; at least one LM CS input for receiving identification codes; and at least one LM CS output for outputting identification codes; wherein said LM CS memory stores data specifying a correlation time;

wherein said LM CS is configured to output product information data including a first product information identification code to said at least one LM CS output in response to receipt via said at least one LM CS input of a first voucher identification code and a first product identification code, only if, said LM CS receives said first voucher identification code via said at least one LM CS input and said first product identification code via said at least one LM CS input within said correlation time of one another.

Aspects depending on the second aspect include (6) wherein said product information data is coupon data; and wherein said LM CS is configured to output coupon data including a first coupon identification code to said at least one LM CS output in response to receipt via said at least one LM CS input of a first voucher identification code and a first product identification code, only if, said LM CS receives said first voucher identification code via said at least one LM CS input and said first product identification code via said at least one LM CS input within said correlation time of one another;

(7) wherein said LM CS configured to output coupon data further comprises: said LM CS configured to store in said LM CS memory (1) identification codes received via said at least one LM CS input and (2) their time of receipt via said at least one LM CS input in association with one another; and said LM CS configured to respond to receipt of a currently received identification code received via said at least one LM CS input, by (1) determining whether said currently received identification code is said first voucher identification code, and (2) if said LM CS determines that said currently received identification code is said first voucher identification code, determining whether time of receipt via said at least one LM CS input of said currently received identification code is within said correlation time of a time of receipt via said at least one LM CS input of said first product identification code;

(8) wherein said LM CS configured to store in said LM CS memory (1) identification codes received via said at least one LM CS input and (2) their time of receipt via said at least one LM CS input in association with one another, sequenced by time of receipt; and wherein said determining whether time of receipt via said at least one LM CS input of said currently received identification code is within said correlation time of time of receipt via said at least one LM CS input of said first product identification code comprises: sequentially retrieving based upon time of receipt, identification codes received via said at least one LM CS input, determining whether time of receipt associated with each retrieved identification code is not within a correlation time of receipt of said currently received identification code and, when determining that time of receipt associated with a retrieved identification code is not within said correlation time, ceasing said sequentially retrieving;

(9) wherein said LM CS configured to output coupon data comprises: said LM CS configured to store in said LM CS memory (1) identification codes received via said at least one LM CS input and (2) their time of receipt via said at least one LM CS input in association with one another; and said LM CS configured to respond to receipt of a currently received identification code received via said at least one LM CS input by (1) determining whether said currently received identification code is said first product identification code, and (2) if said LM CS determines that said currently received identification code is said first product identification code, determining whether time of receipt via said at least one LM CS input of said currently received identification code is within said correlation time of a time of receipt via said at least one LM CS input of said first voucher identification code;

(10) wherein said LM CS configured to store in said LM CS memory (1) identification codes received via said at least one LM CS input and (2) their time of receipt via said at least one LM CS input in association with one another, sequenced by time of receipt; and wherein said determining whether time of receipt via said at least one LM CS input of said currently received identification code is within said correlation time of time of receipt via said at least one LM CS input of said first voucher identification code comprises: sequentially retrieving based upon time of receipt, identification codes received via said at least one LM CS input, determining whether time of receipt associated with each retrieved identification code is not within a correlation time of receipt of said currently received identification code and, when determining that time of receipt associated with a retrieved identification code is not within said correlation time, ceasing said sequentially retrieving;

(11) wherein said LM CS is configured to output, via said at least one LM CS output, voucher data including a voucher identification code in response to said LM CS receiving via said at least one LM CS input a voucher triggering product identification code;

(12) wherein said voucher triggering product identification code is said first product identification code;

(13) wherein said LM CS memory stores a voucher output triggering lookup table, and said voucher output triggering lookup table stores in association with each voucher identification code at least one product identification code; wherein said LM CS is configured to, in response to receipt of a received product identification code, look up in said voucher triggering lookup table whether said received product identification code is associated with said first voucher identification code, and, if said LM CS determines that said received product identification code is associated with said first voucher identification code, outputting to at least one of said at least one LM CS output, outputted voucher data corresponding to said first voucher identification code;

(14) wherein said outputted voucher data includes said first voucher identification code;

(15) wherein said outputted voucher data is stored in a data structure in a certain CS memory of a certain CS in association with said first voucher identification code; and wherein said certain CS is configured to receive via a certain CS input said outputted voucher data in association with a transmitting cellular telephone number from which said voucher data corresponding to said first voucher identification code was transmitted, and to transmit via a certain CS output to said transmitting cellular telephone number said first voucher identification code;

(16) further comprising a wireless electronic transmission device having said transmitting cellular telephone number;

(17) wherein said certain CS is said LM CS;

(18) wherein said certain CS is a CM CS including a CM CS central processing unit, a CM CS memory, at least one CM CS input for inputting data, and at least one CM CS output for outputting data;

(19) wherein said certain CS is configured to store in association with one another cellular telephone numbers and product identifications in a time correlation history database; and said time correlation history database stores said transmitting cellular telephone number in association with product identifications for products having a time of receipt in said LM CS within a second correlation time of time of receipt via said certain CS input of a telephone transmission from said transmitting cellular telephone number;

(20) wherein said time correlation history database also stores in association with each product identification a product identification time of receipt via said at least one LM CS input or said certain CS input;

(21) wherein said product identification time of receipt corresponds to one of time of receipt of a cellular telephone signal in said certain CS, time of receipt of a product identification in said LM CS, and time of receipt of a product identification in said certain CS;

(22) wherein said at least one LM CS input for receiving identification codes comprises a scanner for reading bar codes;

(23) further comprising an intelligent data router containing circuitry configured to transmit all scanned bar code data scanned by said scanner corresponding to identification codes along a first data communication path coupled to said at least one LM CS input and selectively transmitting scanned bar code data along a second data communication path;

(24) wherein said circuitry blocks transmission of voucher identification codes along said second data communication path;

(25) wherein said intelligent router forms part of an intelligent Y cable connecting said scanner to said LM CS;

(26) further comprising a POS CS, a first data communication path from said scanner to said at least one LM CS input, and a second data communication path from said scanner to an input of said POS CS, and wherein said POS CS is configured so that transmission of data from said scanner to said input of said POS CS does not result in an error condition in said POS CS;

(27) further comprising a POS CS, a first data communication path from said scanner to said at least one LM CS input, and a second data communication path from said scanner to an input of said POS CS, and wherein said POS CS is configured so that transmission of a voucher identification code from said scanner to said input of said POS CS results in activation of error code in said POS CS that returns said POS CS to a state in which it awaits receipt of another identification code from said scanner;

(28) wherein said at least one LM CS input for receiving identification codes comprises a key pad having numerals 0 through 9 for entering voucher identification codes in decimal format;

(29) wherein said at least one LM CS input for receiving identification codes comprises a scanner;

(30) wherein said at least one LM CS output comprises a printer; wherein said printer is configured to print a coupon containing a bar code specifying said first coupon identification code in response to receipt by said printer of coupon data including said first coupon identification code;

(31) wherein said at least one LM CS output comprises at least one of a printer, a monitor, and a wireless transmitter; and wherein said at least one of said printer, said monitor, and said wireless transmitter are configured to output at least one of machine and human readable versions of said first coupon identification code;

(32) wherein said coupon data including said first coupon identification code output to said at least one LM CS output includes identification of at least one product for which a coupon having said first coupon identification code can be redeemed; and

(34) wherein said correlation time is between 30 seconds and 2 minutes.

A third aspect comprises a method and system for outputting coupon data, comprising:

a LM CS, said LM CS including; a LM CS central processing unit for processing instructions and data; a LM CS memory for storing data; at least one LM CS input for receiving identification codes; and at least one LM CS output for outputting identification codes;

a POS CS;

a bar code scanner for scanning bar codes; and an intelligent data router containing circuitry configured to transmit all scanned bar code data scanned by said bar code scanner corresponding to identification codes along a first data communication path coupled to said at least one LM CS input and selectively transmitting scanned bar code data along a second data communication path coupled to said POS CS.

An aspect dependent upon the third aspect is (34) wherein said circuitry blocks transmission of voucher identification codes along said second data communication path.

A fourth aspect comprises a method and system for outputting coupon data, comprising:

a LM CS, said LM CS including; a LM CS central processing unit for processing instructions and data; a LM CS memory for storing data; at least one LM CS input for receiving identification codes; and at least one LM CS output for outputting identification codes;

a POS CS having a POS CS input;

a bar code scanner for scanning bar codes and coupled to said at least one LM CS input and to said POS CS input;

wherein said LM CS is configured to output coupon data upon receipt from said bar code scanner of voucher identification data; and wherein said POS CS is configured so that, upon receipt from said bar code scanner of voucher identification, said POS CS either does not enter an error state or executes error handler code the returns said POS CS to a state in which it awaits receipt of another identification code from said bar code scanner.

A fifth aspect comprises a method and a system for issuing product information data to a customer near an end of a customer transaction, comprising: a targeting CS comprising at least one targeting CS central processing unit, at least one targeting CS memory, at least one targeting CS input, and at least one targeting CS output; wherein said at least one targeting CS input is configured to receive product identifiers of product items being scanned at a POS in a retail store; wherein said at least one targeting CS memory comprises a time correlation log; wherein said time correlation log is configured to store at least (1) time of receipt of each product identifier scanned at said POS in association with (2) the corresponding product identifier; wherein said targeting CS memory stores at least one assumed end of transaction rule for assuming when a customer transaction at said POS is ending; wherein said targeting CS is structured to determine from data in said time correlation log and said at least one assumed end of transaction rule an assumed end of transaction time; and wherein said system is configured to convey to a customer at the POS product information data at a time depending upon said assumed end of transaction time.

Aspects depending upon the fifth aspect include wherein said product information data is a voucher ID and said customer transaction is a purchase transaction; wherein said product information data is voucher ID, and said system is configured to display the existence of a voucher and to print the voucher containing said voucher ID, either in response to, or at a specified time after, said assumed end of transaction time; wherein said at least one assumed end of transaction rule comprises a first time interval; wherein said at least one assumed end of transaction rule comprises a first time interval and said rule specifies an assumed end of transaction when said first time interval elapses with no codes received by said at least one targeting CS input; wherein said at least one assumed end of transaction rule comprises a second time interval; wherein said at least one assumed end of transaction rule comprises association of a set of at least two products IDs received by said at least one targeting CS input within said second time interval of one another; and wherein said targeting CS is structured:

(1) to determine whether product identification data newly received in said targeting CS is a voucher ID, and if so, automatically retrieving from said at least one targeting CS memory at least one associated product identifier associated with said voucher ID, then (2) to determine whether pre existing records in said time correlation log have a time of receipt within a first correlation time of time of receipt of said voucher ID and include a product identifier that is said associated product identifier;

(3) to determine whether product identifiers received after said time of receipt of said voucher ID prior to said assumed end of transaction time are said associated product identifier; and to print or display to said customer said information data if (1) is positive and either (2) or (3) is positive.

DETAILED DESCRIPTION OF EMBODIMENTS

These and other objects are provided by the several embodiments of retail store solutions, preferably convenience store solutions, variations thereon, and methods of use, noted below in connection with the figures and there after.

BRIEF DESCRIPTION OF THE FIGURES

FIG. 3 is a data table view of the data structure Voucher Triggering Table 300;

FIG. 4 is a data table view of the data structure Coupon Triggering Table 400;

FIG. 5 is a data table view of the data structure Coupon Triggering Table 500;

FIG. 6 is a data table view of the data structure Scanning Log Table 600;

FIG. 7 is a data table view of the data structure Coupon Print File Lookup Table 700;

FIG. 8 is a data table view of a data structure Output Coupon Data 800;

DETAILED DESCRIPTION OF THE FIGURES AND EMBODIMENTS

Figure 1:
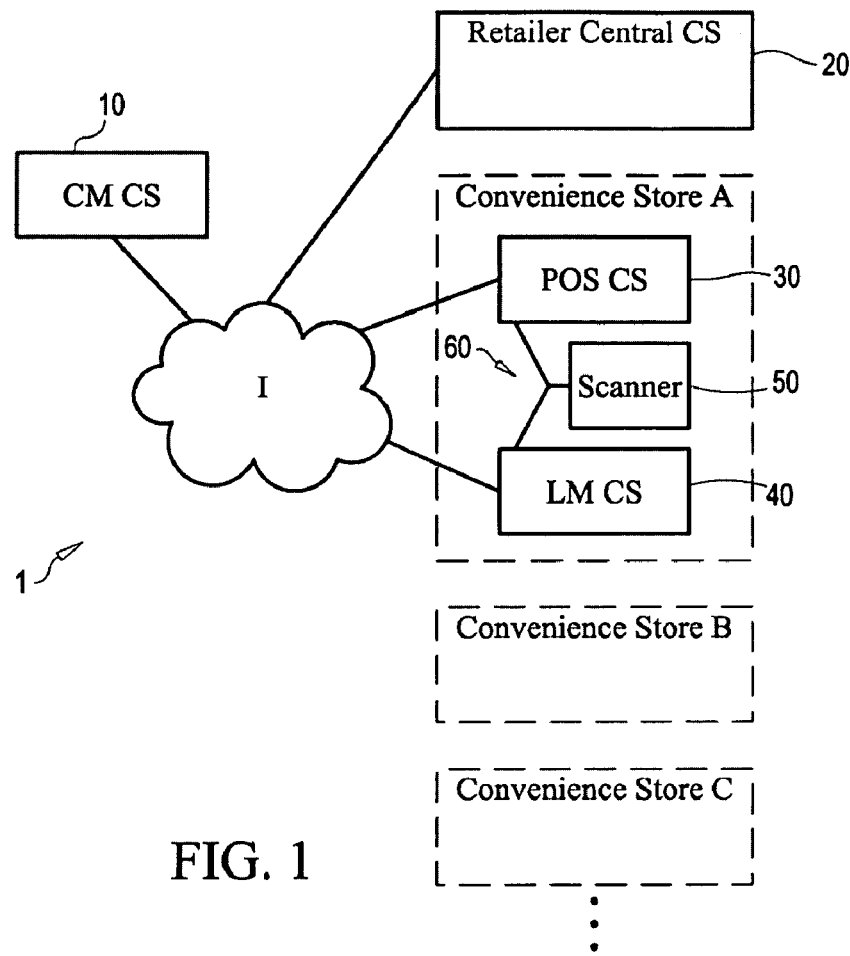
FIG. 1 is a schematic view of network computer system 1.

FIG. 1 shows network CS 1 including CM CS 10, retailer central server CS 20, network, T, convenience store A, convenience store B, convenience store C, ellipses " . . . " indicating an indefinite number of additional convenience stores. FIG. 1 shows that in convenience store A there is POS CS 30, LM CS 40, scanner 50, and intelligent Y cable 60. Although not shown, each of the other convenience stores include their own POS CS, scanner, Y cable, and LM CS. Lines connecting elements in FIG. 1 indicate data communication paths which each may be wired or wireless.

Each CS herein includes at least a Central Processing Unit (CPU) for processing data, a memory for storing data, an in input for receiving data, and an output for outputting data. Examples of memory include RAM, read writeable compact disks, and magnetic memory media hard drives. Examples of inputs include data communication paths from wireless receivers, scanners, numeric keypads, keyboards, computer mouse, touch sensitive screens, and network interfaces. Examples of outputs include data communication paths to printers, monitors, network interfaces, and wireless transmitters. Reference herein to "configured" to perform a specified function in connection with CSs and semiconductor logic devices means either programmed to perform or hard wired to perform the specified function.

CM CS 10 includes a CM CS CPU, a CM CS memory, at least one CM CS input, and at least one CM CS output. Retailer central CS 20 includes a Retailer central CS CPU, a retailer central CS memory, at least one retailer central CS input, and at least one retailer central CS output. POS CS 30 includes a POS CS CPU, a POS CS memory, at least one POS CS input, and at least one POS CS output.

LM CS 40 includes a LM CS CPU, a LM CS memory, at least one LM CS input, and at least one LM CS output. Preferably, LM CS 50 includes a cellular telephone card enabling it to make cellular telephone calls in order to use the cellular telephone network to communicate with CM CS 10. Alternatively, LM CS 40 may have a NIC card and network cable network connection, and/or a WiFi or similar standardized wireless network connection. Preferably, LM CS 40 includes a keypad into which customers may enter codes, such as a sequence of numerals. In addition, preferably, LM CS 40 includes a printer for printing and a display for displaying for customers, product information data, targeted signals, vouchers, codes, and coupons and the existence of a voucher or coupon being printed for the customer. LM CS 40 may have an alphanumeric programmable LED display facing the consumer. LM CS 40 preferably also has a built in bar code scanner (in addition to scanner 50) facing the consumer and remote from the cashier. The built in bar code scanner and keypad preferably enable the consumer to scan their voucher codes and/or manually enter their voucher codes independent of action by the store clerk and independent of scanner 50. In some embodiments having a built in bar code scanner and keypad in LM CS 40, customers are instructed to scan their vouchers or enter their voucher codes in LM CS 40's scanner or keypad. In these embodiments, the requirement for an intelligent Y cable, as opposed to a Y cable, to prevent voucher codes from reaching the POS CS 30 is moot, since bar codes for vouchers would not be transmitted to POS CS 30.

Scanner 50 includes a light source having a specified frequency, a mechanism to sweep the light source across one or more paths, one or more light detectors to detect changes in intensity of light at the specified frequency and duration of those changes. Scanners that scan one or two dimensional bar codes, and stacks of bar codes, are known in the art. Scanner 50 is configured to convert scanned information based upon a predetermined one of plural bar code specifications into a serial data sequence representing decimal numbers in a predetermined one of plural logical data formats. Bar code specifications and logical data formats are well known in the art.

Alternatively, scanner 50 may be, or may include, or there may be in addition to an optical scanner, an RFID scanner and configured to scan product IDs from RFIDs attached to product items brought close to RFID scanner 50. Reference herein to scanner 50 is intended to cover either or both forms of product ID scanners.

Network, I, is a set of computer having logical network addresses and operating to forward information to addresses associated with each packet of transmitted data. Network I may be the Internet or a private network, or pieces of both.

Intelligent Y cable 60 preferably includes a programmable device for filtering the serial decimal data transmitted from the scanner. More preferably, intelligent Y cable 60 includes a Y cable CS including a Y cable CPU, a Y cable memory, at least one Y cable input, and at least one Y cable output. Preferably, the Y cable CS has an input coupling to an output of scanner 50 to receive serial decimal data from the scanner corresponding to bar code identifications scanned by scanner 50. Preferably, a first output of the Y cable CS connects to a scanner input of LM CS 40 to transmit all serial decimal data output from scanner 50 to the LM CS 40. Preferably, the Y cable CS has a second output connecting to an input to the POS CS 30 to selectively transmit serial decimal data to an input of POS CS 30. The Y cable CS is preferably configured to block transmission from scanner 50 to POS CS 30 of scan data providing voucher information, including triggered telephone codes and voucher identifications.

In one embodiment, coupon information is electronically transmitted from LM CS 40 to POS CS 10, thereby mooting the requirement to print a paper coupon. In this embodiment, intelligent Y cable 60 and LM CS 40 are configured to provide two way communication, and intelligent Y cable 60 is configured to forward coupon identifications it receives from LM CS 40 to the scanner input interface of POS CS 30.

Preferably, the intelligent Y cable CS has a configuration input for receiving configuration information and data from LM CS 30 or another source of configuration information. The Y cable CS configuration information may provide to the Y cable CS, the data specification required for the Y cable CS to interpret as decimal data, the data transmitted from scanner 50. The Y cable CS configuration information may also specify scanned identifications to not retransmit, or to block transmission of, to POS CS 30. That is, the Y cable CS may be configured to filter out from the data line coupled to POS CS 30 voucher codes as defined by a voucher code specification. This results in intelligent Y cable 60 blocking all bar codes corresponding to voucher information (including voucher telephone codes and voucher identifications, that is, any code relating to LM CS 40's non coupon outputs to a customer) from the communication line coupled to POS CS 30. For example, the Y cable CS may butter data received from scanner 50, determine its decimal value, and block decimal values whose initial three digits are all zero, if the specifications are that initial three digits of zero means a voucher ID. For example, such a specification may be for all voucher information corresponds to bar codes that begin with "111" or "000" or any other sequence of initial numerals of a bar code not associated with identifications used to identify products, coupons, or other miscellaneous identifications that might be used by the particular POS CS 30. Whatever the data specification of the scanner and the voucher information, intelligent Y cable is preferably configured to block transmission of bar code data corresponding to voucher information from POS CS 30. Preferably, intelligent Y cable 60 is configured to transmit (or not block) all bar code information from scanner 50 to LM CS 40.

Typical POS CS 30 includes a POS CS CPU, a POS CS memory, a POS CS keyboard, a POS CS monitor, a POS CS scanner port to receive a cable connected to scanner 50, and a printer for printing purchase transaction receipts. In addition, POS CS memory preferably stores information including a POS CS product information lookup table for looking up product information such as price and description based upon receipt from scanner 50 of product identifications. Ideally, the POS CS product information lookup table contains one product identifications record for each bar coded product in the store, although it may contain additional product identifications for products not currently in that store. Preferably, POS CS product information lookup table also contains records for manufacturer sponsored coupons each including a coupon identifications, a coupon product description, and a discount value authorized by tender of a corresponding coupon. Preferably, the POS CS is configured to validate scanned coupons by determining from product data during the pending transaction whether the discount value associated with the coupon is authorized. Preferably, the POS CS includes an input receiving and interpreting the serial decimal data transmitted from scanner 50 as product and coupon identifications codes. In the preferred embodiments, scanner 50 and POS CS 30 implemented in a retail store remain unchanged upon addition of LM CS 40.

A typical POS CS in a store owning many companies communicates via network I with retail central CS 20 in order to update its specifications of product IDS, coupon IDS, bar code scanner output data specifications, and exchange transaction information as is well known in the art.

Figure 2:
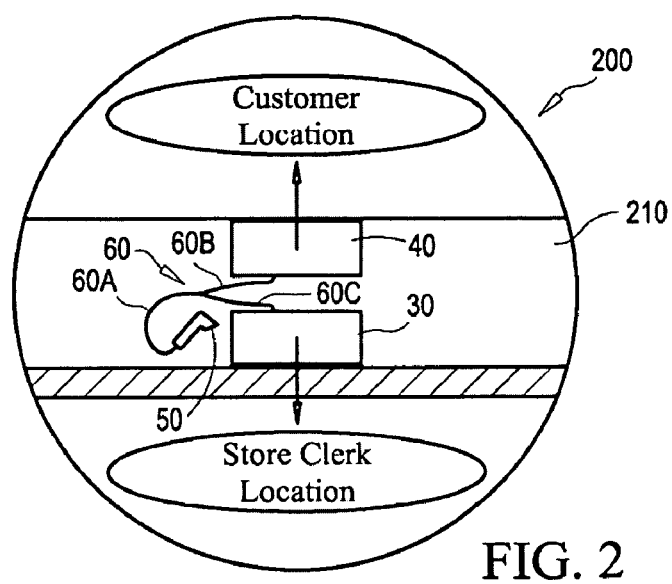
FIG. 2 is a plan view of the area near a POS of convenience store A of FIG. 1.

FIG. 2 shows a section of a convenience store including the area surrounding the POS showing preferred positions of the LM CS 30, POS CS 40, scanner 50 and the people involved in sales transactions. This area includes an area marked "customer location" where the customer normally is located during a purchase transaction, an area marked "store clerk location" where the store clerk normally is located during a purchase transaction, counter top 210, and Y cable line portions 60A, 60B, and 60C. Preferably, the I/O devices including keyboards and keypads of POS CS 30 face the store clerk and are out of reach of the customer. Preferably, I/Os of LM CS 40 faces the customer position and is out of reach of the store clerk when the store clerk is operating POS CS 30.

Figure 9:
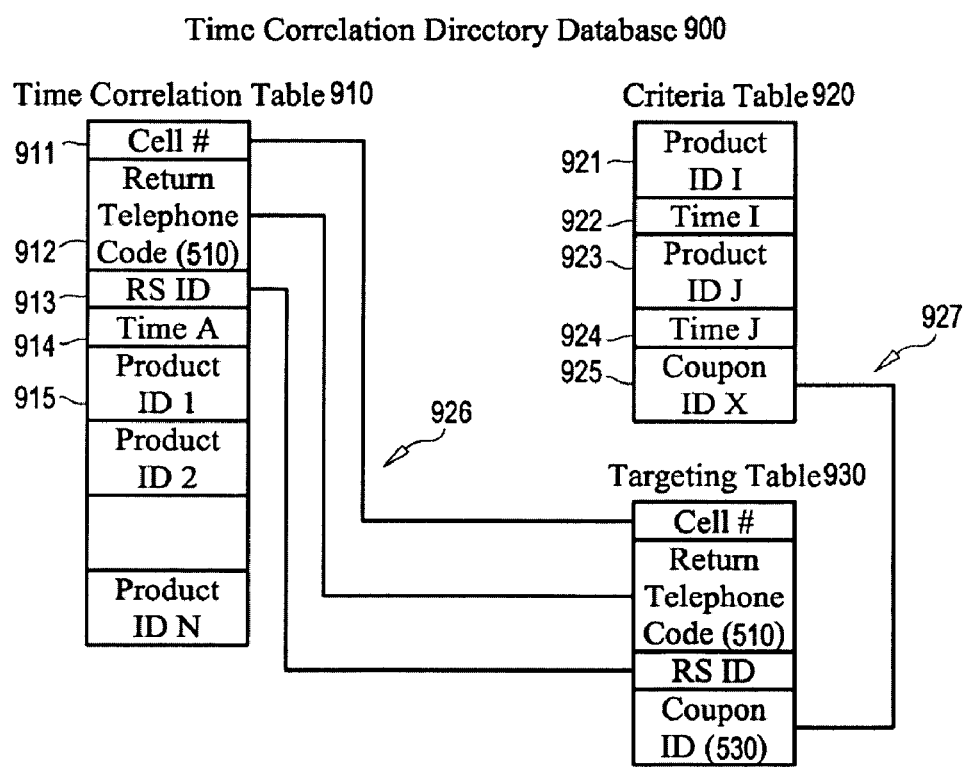
FIG. 9 is a design view of a portion of Time Correlation History Database 900.

FIGS. 3-9 specify data structures in LM CS 40 or CM CS 10, in both, or split between the two, along with variations to account for CM CS 10 storing records for a plurality of LM CSs. FIGS. 3-8 are data table views. FIG. 9 is a design view.

A data table view is a view of logical associations between data stored in a database management system. A design views show field names and associations between fields in different tables in a manner well known in the database art.

Data tables referred to herein contain fields each of which has an association field name, and records each of which has one data cell for each of the data fields. Data in data cells in the same record are associated with one another by virtue of the common identifications of the record in which they are stored.

Fields in distinct tables may be linked, which means that common values in those fields define an association of the corresponding records in those distinct tables. One to one, one to many, and many to many links, as those terms are used in the field of database management, are well known in the art of database management and Structured Query Language programming.

The particular values and relationships of values and digits presented in the following tables are merely exemplary in order to explain one mode of operation relying upon relationships between data fields in some of the tables. In addition, in these tables, the base representation and number of digits are merely exemplary; any number of digits and any base representation are feasible. Moreover, table herein also refers to flat files, such as text files, since it is well known that flat files with identified relationships between the data they store may be used in substitution for relational database files or tables and links.

Referring to FIG. 3 and the other figures for tables, data values in those tables are used throughout the following descriptions to explain operation of novel inventive methods. However, those values and the specification of data format for each field in each table are only exemplary for explaining novel methods. For that purpose, in FIG. 3, triggering product identifications are represented as 6 decimal digits, triggered voucher IDs as 9 decimal digits, and triggered voucher telephone codes as 4 decimal digits. Data in cells of Triggered Voucher ID field 320 includes an initial three digits "111" followed by the same data appearing in cells in the same record in Triggering Product ID field 310. Data in cells of Triggered Voucher Telephone Code field 330 has the same value as the fourth, fifth, sixth, and eighth decimals in the cell for the same record in the Triggered Voucher ID field 320.

FIG. 3 show a data table view of a Voucher Triggering table 300 containing triggering product ID field 310, triggered Voucher ID field 320, and Triggered Telephone Code field 330. FIG. 3 shows exemplary values for data records 340 to 380.

In operation, triggering product IDs are values input into the LM CS that trigger output by the LM CS of triggered voucher IDs and/or triggered telephone codes. Triggered telephone codes are codes a customer can submit by texting them on their personal device such as their cellular telephone, during a telephone call to a specified telephone number. The specified telephone number and instructions for texting are preferably provided to a customer in writing and/or on a monitor by LM CS 40 or CM CS 10 in response receipt of the corresponding triggering product ID. A result of such texting is a reply containing a return telephone code, as discussed in connection with subsequent figures. Both the triggered voucher IDs and the return telephone codes are voucher codes as used herein.

A cellular telephone is one form of a personal device, that is, it has a logical address (cellular telephone number), and it is small enough and light enough to be carried from place to place, and it can communicate via a network with other devices. A CS receiving a triggered telephone code from the personal device responds by (1) identifying the transmitting personal device number (logical address) and (2) transmitting a return telephone code as a text message to the logical address of the personal device (cellular telephone). The triggered voucher ID or the return telephone code (see return telephone code field 510 of FIG. 5) may there after be submitted by the customer for input into the LM CS 40.

In one alternative, Voucher Triggering table 300 also includes fields for a store ID. In one alternative, Voucher Triggering table 300 also includes a field for POS ID (also called checkout station or checkout lane ID) such as when the store has plural POSs and possible plural LM CSs, one at each POS. In one alternative, Voucher Triggering table 300 also includes a field for LM CS ID such as when plural LM CSs exist in one retail store.

Voucher Triggering Table 300 is preferably stored in LM CS 40 memory for use by LM CS 40 in determining when to output vouchers and voucher telephone codes and which such codes to output. Voucher Triggering Table 300 may also be stored in CM CS 10 for one retail store, or for a plurality of retail stores in association with the retail store ID.

In some embodiments, LM CS 40 outputs a voucher code only depending upon to receipt therein of a triggering product ID. In one such alternative, LM CS 40 outputs a voucher code in response to receipt therein of a triggering product ID. In one such alternative, LM CS 40 outputs a voucher code in response to receipt therein of a triggering product ID only if LM CS 40 has not received that triggering product ID within a predetermined time corresponding about to an average purchase transaction time, or if LM CS 40 has not triggered the same voucher code within a predetermined time corresponding to that average purchase transaction time. In one such alternative, LM CS 40 outputs a triggered voucher code only after making a determination that an end of transaction has likely occurred. The goal of voucher output time is to output the voucher after the current transaction has ended but while the customer of that transaction is still at the POS and likely to receive printed or displayed voucher information.

LM CS 40 may assume an end of transaction has occurred after a predetermined time interval has elapsed during which LM CS 40 received no codes from scanner 50. For example, 10 seconds, 15 seconds, 20 seconds, or 30 seconds. The predetermined time interval may vary from store to store, and it may or may not be based upon analysis of time of receipt of scanned codes from that or other stores. LM CS 40 may assume an end of transaction has occurred after receiving a predetermined sequence of bar codes, or after receiving a predetermined set of bar codes within a time window. For example upon receiving scan codes for a sandwich and a drink, indicating a meal purchase, within 15 seconds of one another, may trigger analysis and printing of any resulting triggered vouchers and triggered telephone codes. LM CS 40 may also impose a predetermined delay on printing vouchers after determining to print a voucher, in order to result in the voucher more likely being printed after an actual end of transaction, so that the customer cannot print a resulting coupon and use that resulting coupon in the same transaction. In this first class of alternatives, subsequent submission by the customer of the voucher code (either by scanning, manually keying in, or even telephone transmission) into the LM CS 40 results in LM CS 40 printing of a corresponding coupon.

In the first class of alternatives for printing coupons, the coupon is printed in response to receipt by LM CS 40 of a voucher ID code for which there is an associated product ID. In such alternatives, there is need for table 400 to include product ID field 420 and in table 500 to include product ID field 520. This is because, in the first class of alternatives, receipt by LM CS 40 of an input voucher ID in field 410 results in LM CS 40 retrieving the corresponding coupon ID in Coupon Data 1 field 430, and receipt by LM CS 40 of a return telephone code in Return Telephone Code field 510 results in LM CS 40 retrieving the corresponding coupon ID in Coupon Data 2 field 530. Once LM CS 40 retrieves the coupon ID, that action eventually results in either providing the coupon to the customer or providing the benefit or discount associated with the coupon to the customer.

FIGS. 4-6 are now discussed in connection with the second class of alternatives for providing coupons.

In a second class of alternatives, printing of a corresponding coupon by LM CS 40 is conditioned upon receipt of both the voucher code and a corresponding product bar code (purchase of which provides entitlement of the holder of the coupon to the value of the coupon) within a time window of one another. The time window may initially be set to correspond approximately to the length of a purchase transaction in the corresponding store. For example, 30 seconds, 1 minute, 1 and ½ minutes, or 2 minutes. LM CS 40 may be programmed to truncate the window upon otherwise determining that and end of transaction has occurred, such as due to a predetermine delay in receiving another code from scanner 50, or scanning of a set of product items in a predetermined amount of time also indicating a complete transaction, as noted above. LM CS 40 may print coupons resulting from its receipt of both a voucher code and corresponding product ID code or codes, for use by the customer in the ongoing transaction, as it identifies such coupons upon receiving product ID codes, at an assumed end of transaction, or at a predetermined time after an assumed end of transaction. This second class of alternatives and its time correlation requirements are discussed with respect to some of the following tables.

FIG. 4 shows a data table view of Coupon Triggering Table 400. Coupon Triggering Table 400 includes Input VoucherID field 410, Product ID field 420, and Coupon Data 1 field 430. FIG. 4 also shows exemplary data records 440-447. FIG. 4 also shows ellipses below record 447 indicating the presence optionally of additional records.

In the first class of alternatives, table 400 need only include Input voucher ID field 410 and Coupon Data 1 field 430. Receipt by LM CS 40 of a voucher code ID prompts LM CS 40 to look up the code in field 410 and retrieve the corresponding coupon data from Coupon Data 1 field 430.

In the second class of alternatives, an input Voucher ID value input into LM CS 40 within a correlation time of a Product ID value in the same record in Coupon Triggering Table 400 triggers output by LM CS 40 of the value in Coupon Data 1 field 440 of the same record. Outputting the coupon only if an associated product ID is scanned, limits coupon generation to presumably the same purchase transactions in which both the voucher ID code and the associated product ID code are received in LM CS 40, thereby reducing coupon fraud and also providing presumed redemption data (print by LM CS 40 and receipt of scan of coupon ID code from scanner 50 by LM CS 40) to LM CS 40.

Coupon Triggering Table 400 is preferably stored in LM CS 40 memory for use by LM CS 40 in determining when to output coupon data. Coupon Triggering Table 400 may also be stored in CM CS 10 for one retail store, or for a plurality of retail stores in which case each record also includes an association to at least one retail store ID specifying the retail store or stores in which the input voucher ID is valid.

For purposes of example, Input Voucher ID field 410 values are represented as 8 decimal digits, included an initial "111"; Product ID field 430 values are represented as 6 decimal digits; and Coupon data 1 field 440 values are represented as 4 decimal digits. The four digits in the Coupon data 1 field 440 correlate for example to the digits 4-6 and 8 in the Input Voucher ID field 401, and to the digits 4-6 and 8 in the Triggered Voucher ID field 320. While not essential, correlation of digits in Coupon Data 1 field 430 with digits in fields specifying the corresponding voucher facilitate tracking of triggered Voucher ID to output of coupon data.

Values in Coupon Data 1 field 430 preferably identify either coupon data or a coupon data record address storing coupon data. Coupon data preferably contains a coupon identifications represented in a pre existing coupon specification. For example, there is a standard manufacturers packaged goods coupon specification used to identify products, product purchase requirements (validation), and value of discount associated with each coupon in that specification.

The coupon data may store a value corresponding to the coupon identification, or it may store data resulting in a print (such as a print file) which when printed contains a machine readable version of the coupon identifications, such as a bar code in a conventional bar code specification. Many bar code specification for representing for example sequences of decimal data are well known.

Preferably, there is a one to one correspondence of Input Voucher ID field 410 value to Coupon Data 1 field value. As a result, input into LM CS 40 of an input voucher ID within a correlation time previously specified in LM CS 40 of a corresponding product ID will result in output by LM CS 40 of a determined coupon data.

In operation relating to triggering products and an input voucher, scanner 50 scans products, and the scanned product IDs are input into LM CS 40. If LM CS 40 determines that any such product ID is a triggering product ID in field 310 of table 300, LM CS 40 responds by outputting the corresponding triggering voucher ID in field 320. This output is communicated to the customer at the POS whose product items that person is in the process of purchasing are being scanned. Preferably, communication is via a printout of a voucher by a printer of the LM CS 40 adjacent the customer at the customer location shown in FIG. 2. The voucher preferably includes text specifying one or more products and explaining that the customer can have the voucher scanned and receive a discount when the customer purchases one (or more than one) of those products or some other specified product.

Thereafter, the customer presents the voucher during the same or a subsequent purchase transaction. The bar code scanner scans a bar code on the voucher encoding the voucher ID. LM CS 40 receives the voucher ID and determines whether that voucher ID appears in one or more record in Input Voucher ID field 410. If so LM CS 40 determines whether it receives an input within a correlation time of a product having a value in the corresponding Product ID field 420 of any of the records having the voucher ID. If so, LM CS 40 responds by outputting the coupon data in the Coupon Data 1 field for that record. Preferably, the outputted coupon data results in LM CS 40 printing the corresponding coupon in the LM CS 40 printer adjacent the customer location shown in FIG. 2. Preferably, LM CS 40 also terminates processing looking for matches for the input voucher ID either upon finding a match or upon expiration of the correlation time from time of receipt associated with the input voucher ID.

Thereafter, the customer presents the printed coupon during the same or a subsequent transaction at a POS. Preferably, the coupon is then scanned by scanner 50, and POS CS 30 preferably recognizes the scanned coupon identifications, automatically validates the coupon against purchase of a qualifying product, and provides a specified coupon discount to the purchase transaction total if a qualifying product is being purchased. LM CS 40 preferably also receives an input from scanner 50 containing the coupon identifications.

FIG. 5 shows Coupon Triggering Table 500 including Return Telephone Code field 510, Product ID field 520, and Coupon Data 2 field 530. FIG. 5 also shows exemplary data records 540-547. FIG. 5 also shows ellipses below record 547 indicating the presence optionally of additional records. Note that Return Telephone code field 510 contains voucher IDs.

In operation, a customer inputs a return telephone code to LM CS 40. The customer may enter the return telephone code via a keypad of LM CS 40. The customer may text the telephone code to a cellular telephone number associated with LM CS 40. The customer may otherwise wirelessly transmit from the customer's wireless transmission personal device the return telephone code to LM CS 40 or to CM CS 40 for immediate retransmission to LM CS 40. Upon input by the customer of a return telephone code into LM CS 40, LM CS 40 determines whether that return telephone code corresponds to values in one or more records in Return Telephone Code field 510. If so, LM CS 40 determines whether a product ID scanned within a correlation time of input of that return telephone code is received from scanner 50. Upon making such a determination, LM CS 40 outputs the corresponding coupon data in Coupon Data 2 field 530. Output of coupon data from table 500 is identical to output of coupon data from table 400.

In one alternative, LM CS 40 also includes in the printing of a coupon, printed data identifying any one or more of time of printing; identification of LM CS 40; checkout lane; store location; identification of retail store; and, if printing is based upon coupon data in Coupon Data 2 field 530, data uniquely related to the address of the personal device used to obtain the return telephone code. Such additional information is useful for security purposes to identify and prevent paper coupon redemption and clearinghouse accounting fraud.

Transmission by a customer using a cellular telephone or other identifiable personal wireless device, of triggered telephone code to LM CS 40 or CM CS 10, and data transmission between LM CS 40 and CM CS 10, allows the receiving CS to determine those product IDs scanned within a defined time correlation (such as 30 seconds) with the cellular telephone number (or like ID) transmission, and to transmit back to the personal wireless device of the customer a return telephone code that is unique to that personal wireless device, based upon the telephone number of logical address of the device or cellular telephone. The time correlation association of the cellular telephone number with scanned product identifications and POS (store ID, LM CS ID, lane ID or any combination thereof), and the time correlation of the input of return telephone codes, which are in turn associated with the cellular telephone number, with scanned product identifications, enables LM CS 40 or CM CS 10 or both to generate a time correlation database of presumptively purchased product identifications in association with the cellular telephone number and date of purchase. That enables the CS to perform additional targeted marketing using a time correlation based set of records corresponding to a conventional purchase history database structure. This more targeted marketing includes customizing coupon offers to customers to promote certain behavior, such as preferential purchase of one manufacturers products in a particular product category over time, purchase of products in a different category from those the customer has recently purchased, etc. Once the time correlation history database is established with presumptive purchase transaction records associated with cellular telephone number (or personal device logical address) with a particular person, all of the strategies for targeted marketing employed for purchase history based targeting may be applied. Algorithms for performing the targeting and determining what coupon data to associate with a cellular telephone number, value of resulting coupons, etc, and targeting criteria for those algorithms to apply in data processing may performed and stored in memory on LM CS 40 or CM CS 10. LM CS 40 and CM CS 10 may transmit logged data, targeting data, bar code scanner specifications, and coupon specifications back and forth as necessary to implement various alternatives depending upon where targeting occurs and for updating system data.

In the exemplary data shown in FIG. 5, data in cells of Return Telephone Code field 510 are shown beginning with "XXXXX". This represents a decimal 5 digits that encode uniquely, at least uniquely in relation to the particular store and LM CS 40, cellular telephone number (or interchangeably logical address) to which a return telephone code is transmitted in response to receipt from that cellular telephone number of a triggering telephone code appearing in field 330. The number of digits encoding cellular telephone number is only exemplary, more or fewer digits may be used. The final four decimal digits of Return Telephone Code field 510 preferably correspond to a triggered voucher ID from field 320 associated with the triggered telephone code of field 330 resulting in the subject return telephone code. The product IDs and associated coupon data in fields 520 and 530 result from application of targeting criteria and rules to the time correlation product identifications history data associated with the cellular telephone number associated with the return telephone code.

FIGS. 6 and 7 explain a process in LM CS 40 or CM CS 50 for determining time correlations.

FIG. 6 shows a data table view of Scanning Log Table 600. Scanning Log Table 600 is stored in LM CS 40, or in both LM CS 40 and CM CS 10. Scanning Log Table 600 includes Record field 605, Time of Receipt field 610 and Identification field 620. FIG. 6 also shows time window 660 defined by +50 seconds marker 650 and −45 seconds marker 640 from record pointer 650. Different plus and minus marker times indicate that there may be different correlation time window between time subsequent to and time prior to a record under examination. Record field 605 stores a record ID which is preferably sequentially incremented as records are created for identifications newly input into LM CS 40. Exemplary record 3008 at pointer 650 has identifications code value 11112302. Record 3014, which is within the +50 second marker 630 of pointer 650, has identifications 123457. These values appear in record 444 in table 400 and therefore will result in output of corresponding coupon data via the process explained below.

Referring to table 600, a process relating to the second class of implementations for providing coupons follows. Assume time is 4:00:00 and LM CS 40 has just logged record 3008. In response to the new record, LM CS 40 (or alternatively CM CS 10 assuming it has quick access to data records accruing in LM CS 40) initiates control process 1000 as described below.

Step 1—In control process 1000, LM CS 40 first determines if the most recently generated record 3008 contains a voucher identification, that is, a value stored in any record in Input Voucher ID field 410 or Return Telephone Code field 510. Both those fields contain voucher identifications that may trigger the output by LM CS 40 of coupon data. It does this by one of two methods. LM CS 40 CPU may retrieve values stored in those fields and compare them to the value of the identifications in record 3008. However, that method is inefficient. In a more efficient method, all voucher identifications are encoded with certain digits having specified values, as a filter test value, such as the first three digits being "111" as in input voucher ID field 410's values. In this more efficient method, LM CS 50 CPU compares the specified digits to the filter test value and determines a voucher identifications is present when the digits match the filter test value digit values. In another alternative, LM CS 50 CPU uses a specification relying upon different number of digits for voucher identifications and product identifications.

Step 2—In control process 1000, when LM CS CPU determines no voucher identifications is present, it check for the existence of a new record in table 600. If no such record is present, it enters a wait state for a determined number of clock cycles, and periodically checks again, repeating step 1 until the time of 50 seconds shown as the advance time window marker 630, expires.

Step 3—When LM CS 40 CPU determines a voucher identifications is present (as in record 3008 because for example it has a filter test value "111"), it first performs analysis of past time records. It next determines those records in table 600 with time values within the past time correlation value, which in this example is 45 seconds, as indicated by past time window marker 660. It does this by performing a loop sequentially decrementing by one, the record 605 value, retrieving that new record, and then comparing the newly retrieved record time of receipt to record 3008's time of receipt field 610 value.

Upon reaching a record in which the time difference for times of receipt exceed the past time correlation time, this loop terminates. Concurrently with determinations that time is less than the past time correlation time, or thereafter, LM CS 40 CPU retrieves identifications from the corresponding record in table 500. It then sequentially retrieves records in tables 300 and 400 that have the product ID specified in record 3008 (11112302), retrieves the Product ID associated with each such record, and compares that product ID to the values for product IDs in the records in Scanning Log Table 600 whose time of receipt has been determined to be within the 45 seconds past time correlation time. If a match occurs, LM CS 40 CPU retrieves the coupon data from the corresponding Coupon Data 1 or Coupon Data 2 field of the corresponding record for which the match was identified in either table 400 or table 500.

Step 4—LM CS 40 CPU then preferably outputs the retrieved Coupon data and stores a record of the output coupon data and time of output of the coupon data and other data, in table 700. Alternatively, LM CS 40 stores the retrieved coupon data until its process steps relating to record 3008 are complete, for example storing this data in table 700. In either case, LM CS 40 preferably compares stored coupon data retrieved in response to processing record 3008 and limits its output to only one instance of any coupon data to avoid presenting the consumer with duplicates of the same coupon incentive offer. This limiting step involves an additional sequence or loop of comparisons of coupon data retrieved in response to processing record 3008. This step also substantially reduces the prospect of bulk fraudulent coupon redemption by limiting the frequent of production of coupons resulting from a particular voucher identification.

Step 5—An interesting aspect of time correlation is forward time correlation. Processing relating to record 3008 continues for a future time correlation time after time of receipt of record 3008, such as 50 seconds, as indicated by pointer 530. The past and future portions of time window 560 relative to a record may be asymmetric. In any case, LM CS 40 may compare either time of newly generated records, or a system time, to time of record 3008, and continue comparing identifications in field 520 in the manner specified for past identifications to determine coupon data to output in relation to record 3008 until time of the most newly generated record is more than the future time correlation time, 50 seconds, and then cease comparing.

As with the past time correlation steps, LM CS 40 CPU may log the retrieved coupon data, and output the retrieved coupon data to table 700, and filter before outputting the coupon data to avoid duplicate outputs. See the description of tables 700 and 800 in FIGS. 7 and 8 for processing of logged retrieved coupon data not yet sent to a printer or otherwise for presentation to the customer.

Future time correlation also requires newly received records be processed in the manner specified for record 3008 when record 3008 was the newest record. This is preferably performed by parallel processing. A most effective way for LM CS 40 to implement this is, in a step 4.5 after step 4 and before step 5.

Comparison of the data values in Table 600 shows that record 3014 is within the time correlation window of record 3008 and has an identifications for a product that is in a record in tables 400 or 500 with the voucher identifications of record 3008, specifically record 444 of table 400, which has the coupon data value "1232". Thus, processing of record 3008 in this example results in output of coupon data 1232.

Step 4.5—LM CS 40 CPU increments record value (from 3008 to 3009) and initiates a new instance of control process 1000.

Thus, as soon as LM CS 40 CPU has finished processing of records in the past time correlation time window for each record in table 600, it starts a new instance of the control process which starts processing of the past records within the past time correlation time window of the time of receipt of the new record in file 600, for that new record. That mechanism effectively uses processor cycles because it minimizes clock cycles wasted in step 2 in the wait state.

It should be emphasized that the LM CS 40 of CM CS 50 performs the foregoing operations by storing to memory input data, looking up in memory for use by a CPU the retrieved data for comparisons, additions, subtractions, and decisional steps, and instructing peripheral devices, such as outputs, to output data in predetermined formats compatible with output devices.

FIG. 7 shows Coupon Print File Lookup table 700 including Coupon Identifications field 710 and Coupon Print File field 720. Coupon Identifications field 710 for example contains values stored as coupon data in Coupon Data 1 field 430 and Coupon Data 2 field 530. In the foregoing example, output of coupon data 1232 results in LM CS CPU or a printer peripheral processor retrieving the print file name associated with coupon identifications 1232 from table 700, which is printer file name 1232.prt. In the preferred embodiment, LM CS would be configured to print that file to a printer adjacent the customer's location at the POS. The file 1232.prt would include in it the image of a bar code representing a coupon, such as a manufacturer's coupon for a product, in a conventional format, for scanning by scanner 50.

Note that print file 1232.prt is correlated via the data associations in the foregoing tables back to record 350 in table 300, record 444 in table 400, record 544 in table 500. Thus, a resulting coupon or instructions for its printing are correlated amongst the data tables with voucher triggering data, voucher data, coupon data, and resulting coupon.

FIG. 8 shows Output Coupon Data table 800 including Coupon ID field 810; Voucher ID or Return Telephone Code ID field 820; Product ID field 830; Time of Receipt field 840; Final Output Time field 850; Final Output Flag field 860; and Final Output Status field 870. A record corresponding to the example discussed above is 880. Coupon ID field 810 contains the coupon identification output by LM CS 40 CPU. Voucher ID or Return Telephone Code ID field 820 contains the data value from field 620 resulting in output the coupon data in field 810. Product ID field 830 contains the product ID found to meet time correlation criteria to the data value in field 820 resulting in output the coupon data in field 810. Time of Receipt field 840 contains the corresponding time of receipt from table 600. Final Output Time field 850 contains a time at which LM CS CPU or a peripheral processor retrieves from table 700 the corresponding coupon print file and instructs a printer to print that file. In some records, records for which LM CS CPU or a peripheral processor does not retrieve data from table 700, Final Output Time field 850 may contain a null value or a default value.

Final Output Flag field 860 contains a logical value indicating whether the corresponding record was processed to determine whether to look up a coupon print file in table 700. Final Output Status field 870 contains a logical value indicating whether the data in Coupon ID field 810 was used to look up a coupon print file in table 700.

In operation, LM CS 40 CPU outputs to table 800. LM CS CPU (or a peripheral processor) then implements control process 2000 to determine whether to output print or otherwise convey to a customer coupon information corresponding to the coupon ID stored in Coupon ID field 810. Generally speaking, LM CS 40 CPU uses table 800 to filter out and not send coupon information to customers for two records having identical coupon IDs in Coupon ID field 810 within a third correlation time of one another. This is performed for example by post processing step 6.

Step 6—In control process 2000, LM CS 40 CPU preferably retrieves from memory a third correlation time. LM CS 40 CPU retrieves from table 800 the data for the most recent record, in this example, record 880. It then sequentially retrieves the data for previous records and determines time difference between the value for Time of Receipt field 840. If that time is less than the third correlation time, for example 30 seconds, it determines if the value for the Final Output Status is "Y" for yes, meaning that the previous record had previously been processed to determine to convey its corresponding coupon information to the customer, and whether Final Output Flag of the earlier record is "Y" for yes, meaning that the coupon data for that record was retrieved from table 700 and conveyed to the customer. If those conditions are met, it determines if the values for the Coupon ID field for both records are not identical. If so, it enters the current system time in the Final Output Time field 860, sets the Final Output Flag field 860 value to "Y" for yes, indicating that the data in Coupon ID field 810 is being used to look up and convey coupon information to the customer, and sets Final Output Status field 870 to "Y" meaning that processing to determine whether to convey corresponding coupon information to the customer for this record was completed. In addition, LM CS CPU 40 or the associated processor implements the step of retrieving from table 700 the coupon print file corresponding to the value of Coupon ID field 810 in table 800, and instructs printing or otherwise Outputting of that coupon file. If any of the foregoing conditions is negative, LM CS 40 CPU sets the values for Final Output Flag field 860 and Final Output Status field 870 to "N" for no. Upon instructing printing or determining not to print based upon the current record, such as record 840, control process 2000 enters queries table 800 for a newer record than record 870. If no new record exists, control process 2000 enters a wait state and repeats the query.

FIG. 9 shows Time Correlation History Database 900 including design views of Time Correlation Table 910, Criteria Table 920, and Targeting Table 930. Database 900 is used for targeting of information, such as product information and coupons. An underlying assumption is that product items scanned within a correlation time of scanning, or some other indicia of product items in the same purchase transaction, of a voucher associated with a logical address such as a cellular telephone number, are for products purchased by the customer using the corresponding cellular telephone. Table 910 is generated in view of that assumption by executing code on either LM CS 40 or CM CS 10 designed to assume which product IDs were purchased in a purchase transaction by a particular customer. It does so using one or more correlation times and/or product ID association rules to generate records of assumed purchase transactions.

Time Correlation table 910 contains fields Cell# 911; Return Telephone Code (510) 912; RS ID (retail store ID) 913; Time A field (time field); and a plurality of product ID fields 915. Cell# field contains the cellular telephone number or logical address associated with return telephone code (510). RS ID field 913 contains an identifications of the retail store or retail store and checkout lane (based upon identifications of adjacent LM CS) in which triggering telephone code (330) was printed. Time A field 914 contains a time associated with receipt of Return Telephone Code (510) field 912. Product ID fields 915 contain product identifications associated by time correlation with Time A.

In operation respecting generation of table 910, the acting CS determines all product identifications scanned within a time correlation (or future time and past time correlations) of when a return telephone code was scanned, and stores those product identifications in association with the cellular telephone number, return telephone code, and time of scanning of the return telephone code, in a record in table 910. Repeated processing of all scanning log data results in records in time correlation table 910 that appear formally to be records for purchase transactions in the corresponding retail store.

Criteria Table 920 is only exemplary of a targeting criteria table. Criteria Table 920 contains fields for "Product ID I" in field 921; Time I in field 922; "Product ID J" in field 923; Time J in field 924; and "Coupon ID X" in field 925. Targeting Table 930 contains results of targeting applying criteria specified by table 920 to data contained in table 910. Targeting Table 930 contains fields for cellular telephone number, cell#; return telephone code (510); RS ID); and coupon ID (530). Lines 926, 927 between fields in tables 910, 920, and 930 indicate associations or database links of fields containing similar information in different tables.

Criteria Table 920 contains exemplary criteria for processing data in records in Time Correlation Table 910 in order to associate coupon IDs (or coupon data, or marketing data generally, or resulting targeted communication generally) with cellular telephone numbers or logical device addresses for subsequent presentation to the customer of a targeted information, optionally via printing of a triggered telephone code. Optionally, the triggered telephone code also encodes the customer's cellular telephone number.

In operation, the processing CS determines whether transaction records for a cellular telephone number in table 910 satisfy criteria specified in table 920. More specifically, the processing CS determines if, from records in table 910 that have the same cellular telephone number, there is one record that has the value for "product ID I" within a fourth correlation time of time I and another record that has "product ID J" within a fifth correlation of time J. If so, the processing CS stores a record in table 930, including generating a return telephone code encoding the cellular telephone number. Data in targeting table 930 is used by the targeting CS (LM CS 40 or CM CS 10) to recognize a scanned or otherwise entered return telephone code for providing the customer with a coupon based upon the associated coupon data in the manner described herein above.

Figure 10:
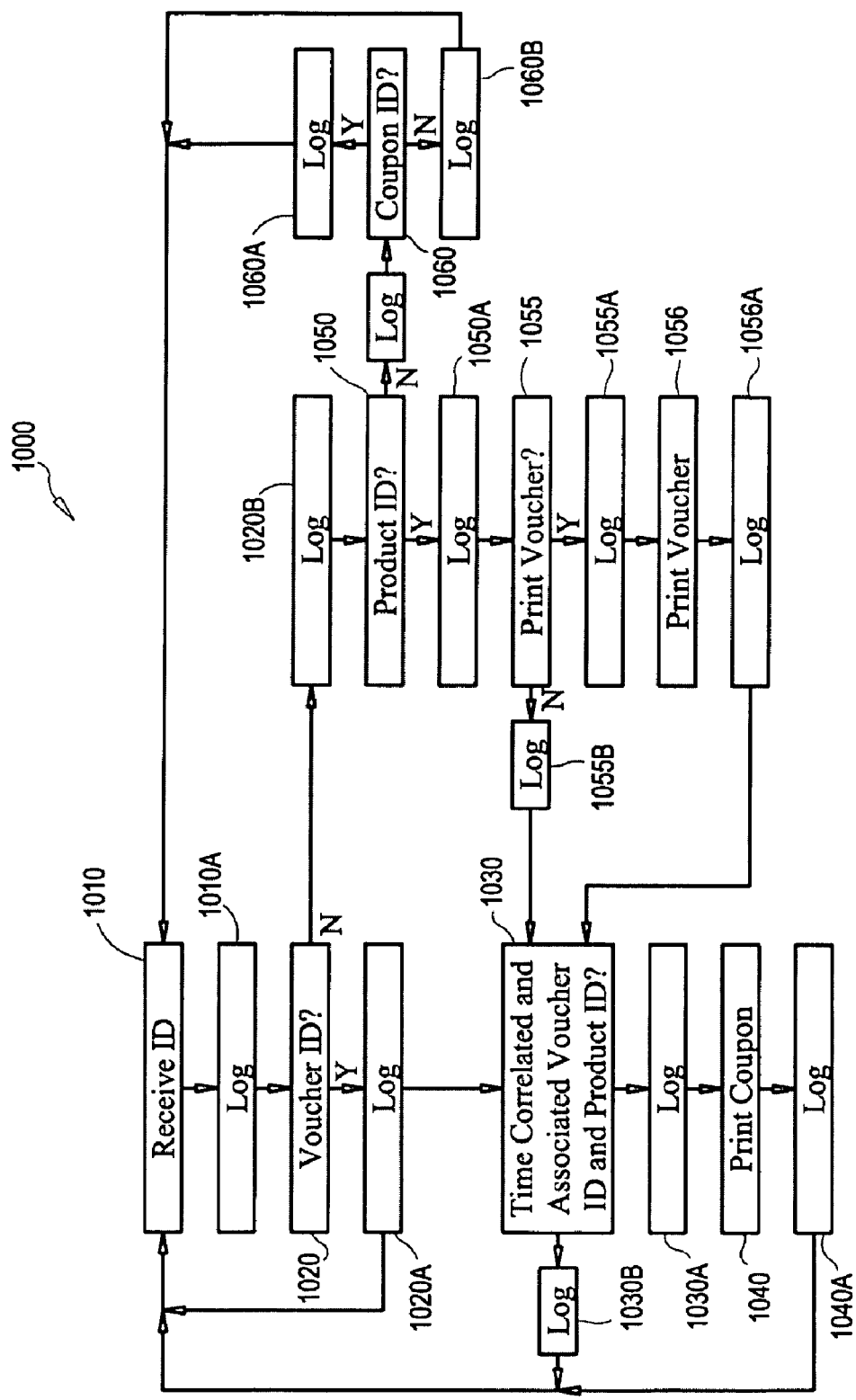
FIG. 10 is a high level flow chart showing logical flow of decisions and actions by LM, CS 40.

FIG. 10 shows a high level process flow chart 1000 of process flow in LM CS 40, in CM CS 10, or distributed between them, for performing the high level processing steps of a certain embodiments. Reference below is to LM CS 40 only, for convenience, but each step may be performed by either one or both of LM CS 40 and CM CS 10.

In step 1010, LM CS 40 receives from a scanner (either scanner 50 or a separate scanner forming part of LM CS 40) an ID and proceeds to step 1010A.

In step 1010A, LM CS 40 logs the received ID and proceeds to step 1020. For example, this logging may be addition of a record in table 600.

In step 1020, LM CS 40 determines if the ID is a voucher ID (including for example a return telephone code ID). This determination may be based upon comparison to voucher ID specification or by comparison to actual voucher IDs stored for example in Input Voucher ID field 410 in table 400 and return telephone code field 510 in table 500. If the determination is yes, LM CS 40 proceeds to step 1020A. If the determination is no, LM CS 40 proceeds to step 1020B. In steps 1020A and 1020B, LM CS 40 logs the step 1020 determination.

From 1020A, LM CS 40 proceeds to step 1030.

In step 1030, LM CS 40 determines whether to print a coupon. In the first class of implementations, there merely requires no time correlation determination. In the second class of embodiments, LM CS 40 determines if there is a voucher ID and a product ID with which the determined voucher ID is already associated in memory on LM CS 40. For example whether such IDs were received within 30 seconds, 45 seconds, 60 seconds, 90 seconds, or 120 seconds of one another. And in addition, whether those two IDs are associated with one another in memory in LM CS 40, for example, residing in the same records as one another in either Coupon Triggering Table 400 or Coupon Triggering Table 500. If yes, LM CS 40 proceeds to step 1030A. If no, LM CS 40 proceeds to step 1030B.

In step 1030A. LM CS 40 logs the step 1030 determination and proceeds to step 1040.

In step 1040, LM CS 40 prints a coupon associated with the determined voucher ID and proceeds to step 1040A. For example, the coupon associated with the coupon data in the record in Coupon Triggering Table 400 or Coupon Triggering Table 500 that contains the associated and time correlated voucher ID and product ID.

In step 1040A, LM CS 40 logs the printing of the coupon printed in step 1040 and proceeds to step 1010.

In step 1020B, LM CS 40 logs the determination in step 1020 and proceeds to step 1050.

In step 1050, LM CS 40 determines whether the ID received from scanner 50 in step 1010 is a product ID. If yes, LM CS 40 proceeds to step 1050A. If no, LM CS proceeds to step 1050B.

In step 1050A, LM CS 40 logs the determination in step 1050 and proceeds to step 1030.

In step 1050B, LM CS 40 logs the determination in step 1050 and proceeds to step 1060.

In step 1055, LM CS 40 determines whether the product ID triggers printing of a voucher.

In step 1055A AND 1055b, LM CS 40 logs the determination in step 1055.

In step 1056, LM CS 40 prints any voucher triggered by the product ID, and returns processing to 1030.

In step 1060, LM CS 40 determines whether the ID received in step 1010 is a coupon ID. If yes, LM CS 40 proceeds to step 1060A. If no, LM CS proceeds to step 1060B.

In both steps 1060A and 1060B, LM CS logs the determination in step 1060, and proceeds to step 1010.

Figure 11:
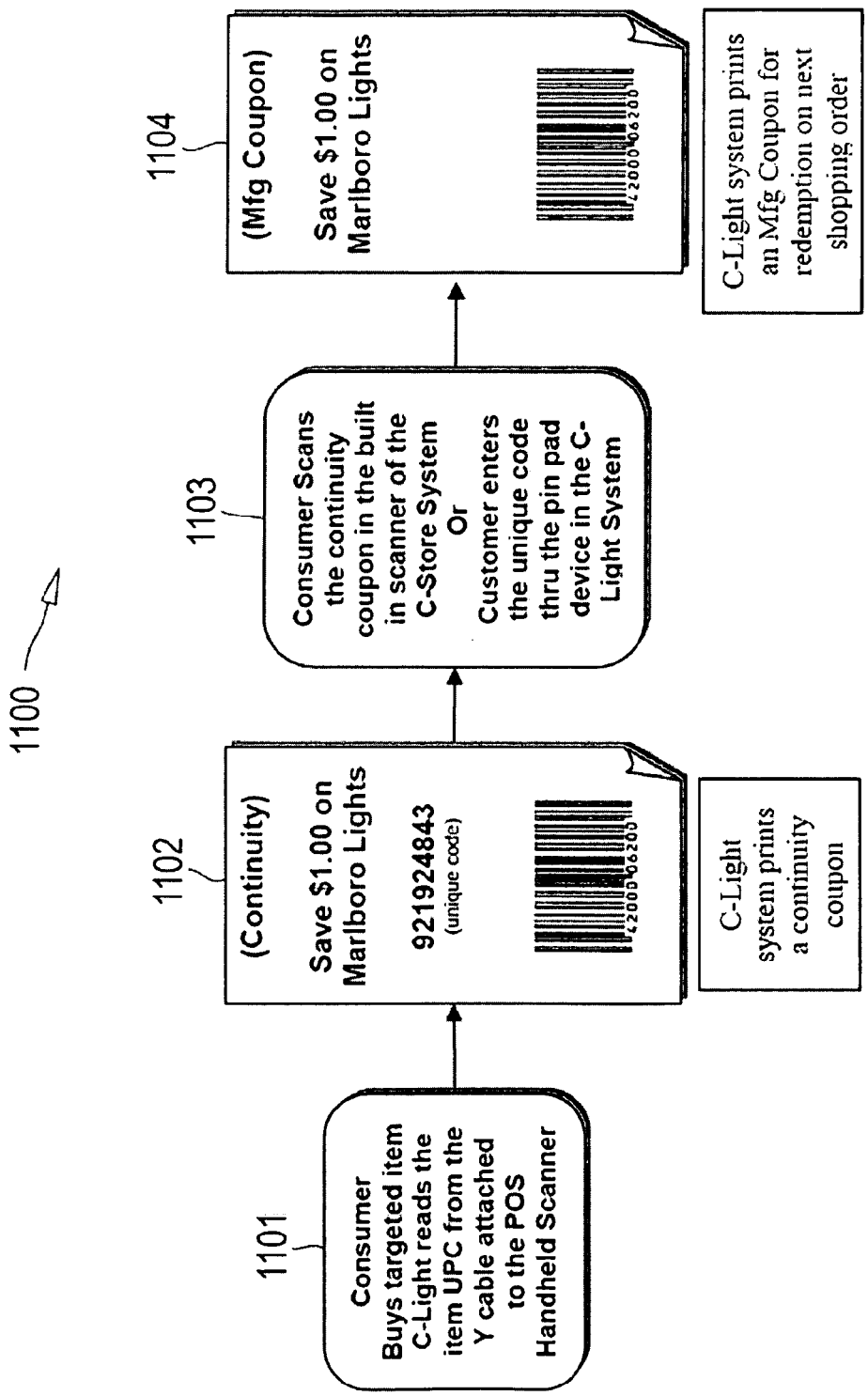
FIG. 11 shows process flow 1100 for printing vouchers and coupons.

FIG. 11 shows process flow 1100 for a consumer buying a targeted item. At that time, the C-Light CS (a.k.a. LM CS 40) reads the item UPC from the Y cable attached to the POS Handheld Scanner 50. In 1102, C-Light CS prints a voucher having unique numeric code 921924843, a bar code corresponding to numerals 4200006200, and text stating "Save $1.00 on Marlboro Lights". In 1103, the consumer scans the voucher in the scanner built into the C-Light CS, not scanner 50 connecting to the C-Light system and POS CS 30. Alternatively, the consumer enters the unique code via the keypad of the C-Light system. In response, in 1104, LM CS 40 prints a standard coupon for $1.00 on Marlboro Lights (not shown) and also prints a voucher for another manufacturers coupon having the same bar coded numerals 4200006200 and advising the customer "Save $1.00 on Marlboro Lights". Use of the same bar code numerals 4200006200 enables the C-Light CS to associate successive purchase transactions with the same customer.

Figure 12:
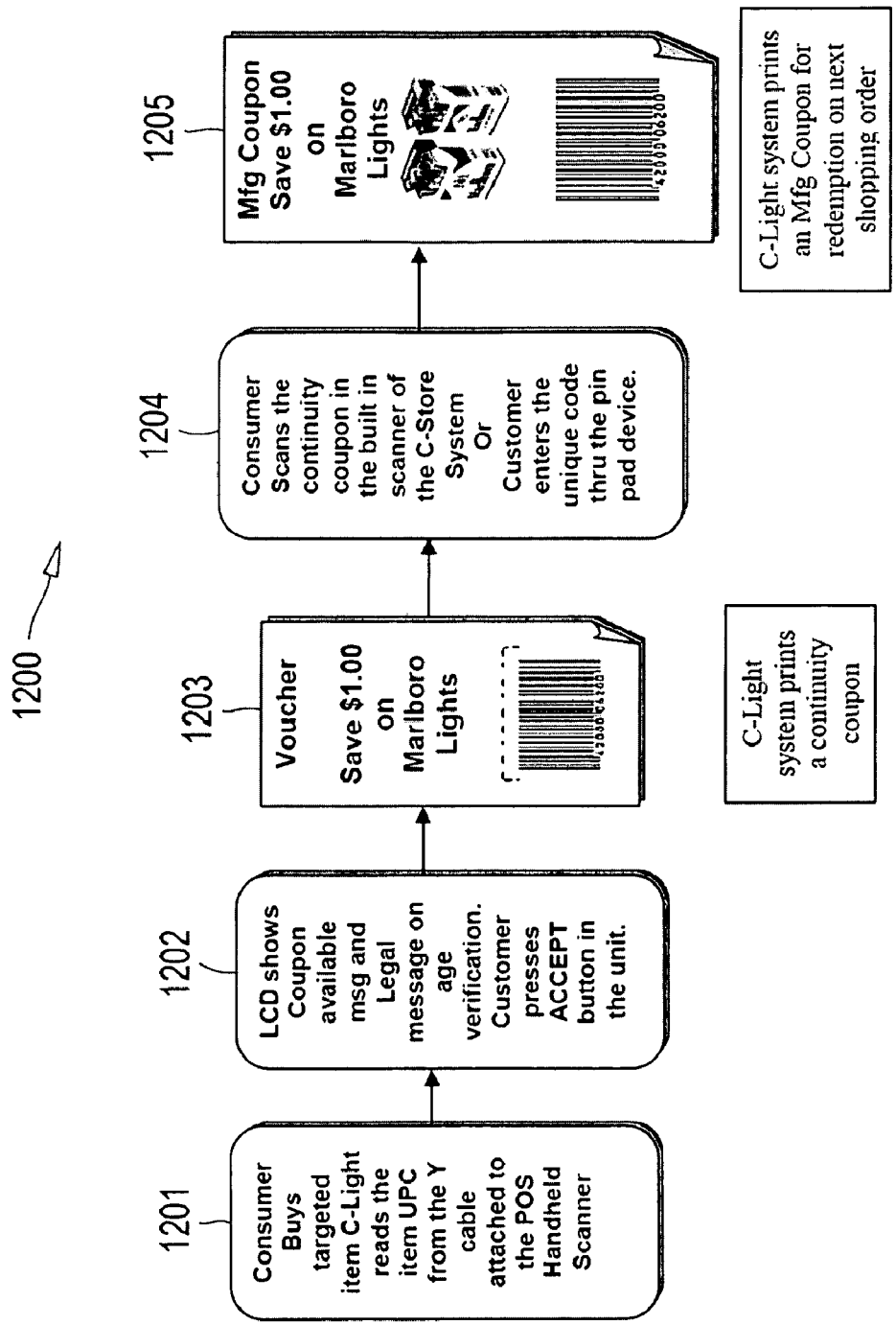
FIG. 12 shows process flow 1200 for printing vouchers and coupons for certain regulated products.

FIG. 12 shows process flow 1200. in 1201, the customer buys a targeted item. The C-Light CS reads the product ID (also referred to as a UPC) from the Y cable attached to scanner 50. In 1202, an display (LCD display) shows a "Coupon Available" message to the customer, and a legal message about age verification. The customer, if of age, presses an "Accept" button on the keypad of the C-Light CS. In 1203, the C-Light CS responds by printing a voucher stating "Save $1.00 on Marlboro Lights". In 1204, the customer scans the voucher with the scanner built into the C-Light CS or enters the unique code via the keypad of the C-Light system. In 1205, in response, the C-Light CS prints a coupon stating "Save $1.00 on Marlboro Lights" and containing the same bar coded numerals 4200006200 as the voucher in step 1203.

Figure 13:
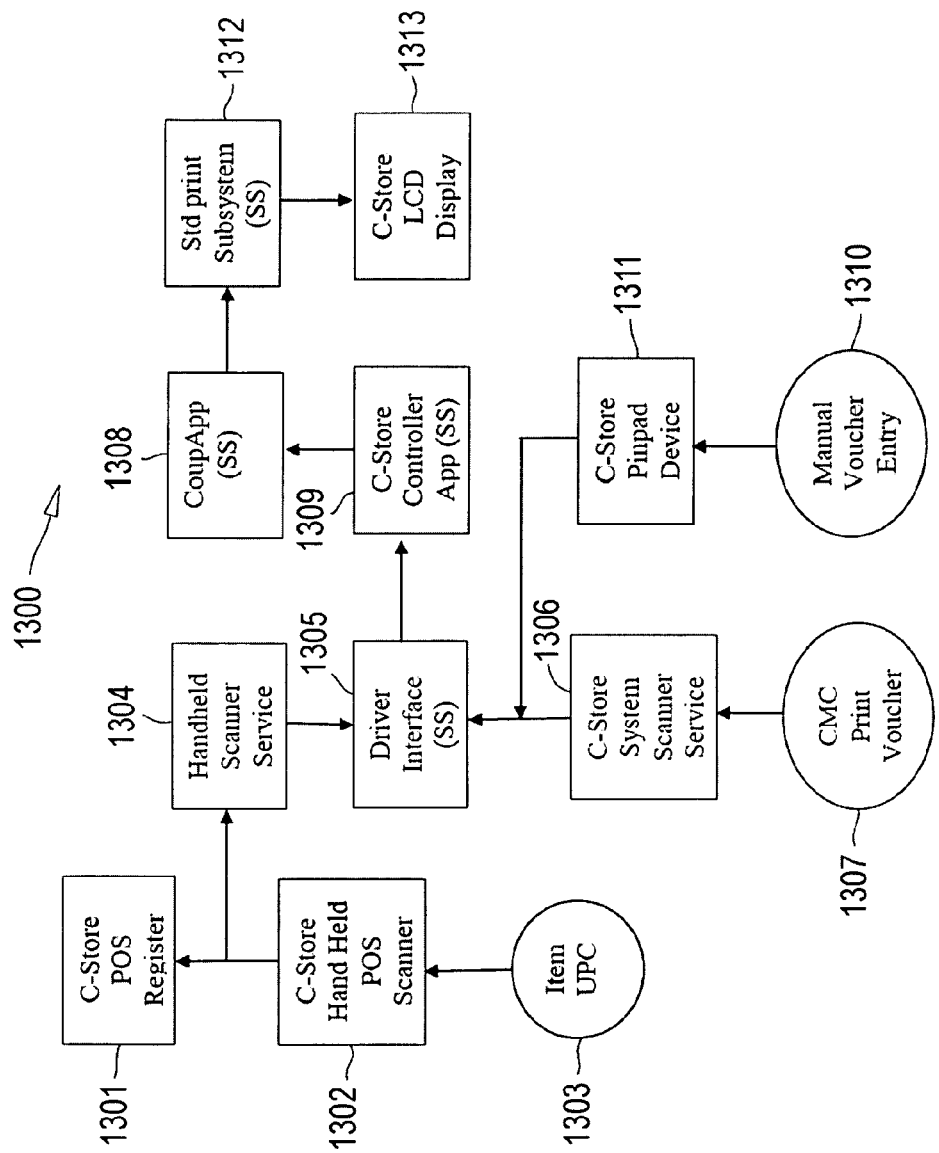
FIG. 13 shows software interface diagram 1300 for one embodiment of LM CS 40.

FIG. 13 shows software interface diagram 1300 including C-Store POS register 1301, C-Store Hand Held POS Scanner 1302, Item UPC 1303, Hand Held Scanner Service 1304, Driver Interface (SS) 1305, C-Store System Scanner Service 1306, CMC Print Voucher 1307, CoupApp (SS) 1308, C-Store Controller App (SS) 1309, C-Store PinPad Device 1311, Manual Voucher Entry 1310, Std. Print Subsystem (SS) 1312, and C-Store LCD Display 1313.

In operation, a UPC) product ID) scanned by the scanner 50 in steps 1302, 1303. Date therefrom flows to the POS CS 30 (1301) and to the Handheld Scanner Service 1304 in LM CS 40. LM CS 40 then responds to that data by effecting process flow 1309, 1308, 1312, and 1313 possibly resulting in display in LCD display of product information data in 1312 and printing of a coupon in 1312.

In operation, a voucher is read by the LM CS 40's scanner in 1306, 1307, data from which is processed by LM CS 40 Driver Interface 1305, which flows to step 1309 for determination whether to print and display a coupon and product information data.

In operation, a voucher ID may be entered in a keypad, corresponding to steps 1310 and 1311, which data thereafter flows to LM CS 40 Driver Interface (SS) 1305, and is processed as discussed above.

One method of updating the LM CS 40 includes the local LM CS 40 wirelessly connecting via the cellular telephone network to the CM CS 10 and then updating its local files based upon data received from the CM CS 10. In this method, LM CS 40 preferably includes a cellular network card. This data comprises voucher Identifications ("IDs"), correspondence of voucher IDs to coupon offers, coupon offers, and related files, and updates to specifications of for bar code scanner 50, and product identifications. In one embodiment, this information would also include customer cellular telephone number (or portion thereof such as the last 4 digits) corresponded to coupons for certain products, using the cellular telephone number as an identifier.

Customer Oriented Description of the Preferred Methods of Use

As indicated above, processing is described as performed by LM CS 40, but may be distributed with CM CS 10.

In a first preferred method of use, a customer present a product for purchase. Scanning of that product by scanner 50 results in LM CS 40 printing a voucher adjacent the customer. The voucher contains writing stating that it can be presented for obtaining a coupon on one or more specified products. The voucher contains a bar code.

The customer presents the voucher at some point in time when purchasing a product specified on the voucher. The voucher and the specified product are scanned by scanner 50.

LM CS 40 receives inputs of the identifications for the specified product and the voucher, which prompts LM CS 40 to determine whether they are scanned within a correlation time of one another.

If LM CS 40 determines that both items are scanned within the correlation time, LM CS 40 responds by printing a corresponding coupon adjacent the customer's location at checkout.

The customer may then present that coupon for scanning which will result in the POS CS reducing the sales price for the customer's order by a discount amount specified in the coupon.

In a second preferred method of use, a customer present a product for purchase. Scanning of that product by scanner 50 results in LM CS 40 printing a voucher adjacent the customer. The voucher contains writing stating that it can be presented for obtaining a coupon on one or more specified products. The voucher specifies a telephone number and a triggered telephone code.

The customer calls the specified telephone number and enters the triggered telephone code.

A CS that received the triggered telephone code transmits back to the sending telephone number, typically a cellular telephone number, a return telephone code.

The transmission back to the sending telephone number may also identify the specified products.

When purchasing one of the specified products, the customer enters the return telephone code via a keypad on the LM CS 40, into LM CS 40. LM CS 40 responds by examining product items scanned within a correlation time of its receipt of the return telephone code, determining if any of those products are specified products, and if so, responds by printing a corresponding coupon.

LM CS 40 preferably also prints another voucher. Preferably, the new voucher contains a voucher identifications and/or a triggered telephone code that encodes the customer's cellular telephone number. As a result, the customer's subsequent use of the new voucher identifications and/or a triggered telephone code time correlated to scanning of product identifications may be used to build a time correlation history database of assumed purchases over time in association with the customer's cellular telephone number.

Broad Conception of Use of Time Correlation of Product Identifications

In a broader concept of the invention, the time correlation of receipt of two identifications codes from items scanned at a scanning location, such as a POS or a point of entry of medical or medical prescription information is used to trigger transmission of consumer information, such as medical information, to a consumer related to the items being scanned. Such information may be medical information, marketing information, incentive offers, vouchers, or coupons. For example, LM CS 40 may be programmed to respond to input within a time correlation (say 30 seconds) of two scanned product identifications for medicines known to have harmful interactions by printing or displaying or voicing a warning message. For example, scanning of two different anti inflammatory medicines, or scanning of two anti histamines, may trigger printing of a warning indicating that use of both medicines is contra indicated. Similarly, scanning of any two products having some relationship there between may trigger printing of information about that relationship. For example, scanning identifying milk and peanut butter within 30 seconds of one another may trigger LM CS 40 to print a message noting that consumption of milk and peanut butter at the same time provides a more complete protein. This type of implementation outputs product information data or targeted signals, which may or may not include coupon or voucher data.

Use of time correlation avoids the requirement to receive an end of transaction signal in order to associate a set of product identifications within a purchase transaction, or any other type of data input transaction, such as prescription entries and optionally related purchases in a pharmacy store. As a result, systems responding to time correlations between entered data are feasible and cost effective alternatives to systems that rely upon receipt from a point of entry or point of sale or pharmacy management system for an end of transaction signal. For example, a retail store including plural LM CSs or one LM CS employing plural Y cables or equivalent all communicating with the one LM CS in a store, are feasible alternatives. Plural intelligent Y cables or their alternatives noted above, in addition, to wired or wireless transmission therefrom to a single LM CS per retail store, or a number of LM CSs that is less than the number of checkout lanes, is contemplated. In such embodiments, voucher information printed near each POS would include encoded identifications of the corresponding POS or checkout location in addition to other information noted above, in order to also correlate the identifications scanned at that checkout location and voucher codes, with one another.

Electronic Coupons Transmitted from LM CS 40 to POS CS 10 During the Transaction Instead of Printing Paper Coupons In one preferred embodiment, instead of printing a coupon containing a scannable bar code, LM CS 40 outputs coupon data by transmitting the corresponding standardized coupon identifications directly to POS CS 30 via its scanner input connected to intelligent Y cable 60. One implementation of this embodiment includes a variation of intelligent Y cable 60 such that intelligent Y cable 60 supports two way data communication to and from LM CS 40. In this implementation, intelligent Y cable is configured to receive from LM CS 40 a coupon identification and transmit that coupon identification promptly to POS CS 30. Promptly, here, means for example after completion of transmission of data for a bar code scan buffered in and not yet sent from Y cable 60 to POS CS 30. As a result, the same safeguards against fraud as for printed coupons exist and in addition the customer is relieved of the requirement to receive and have a scanned a paper coupon. Moreover, LM CS 40 may be configured to forward a log file containing its transmission of coupon identifications to CM CS 10 or to a coupon clearinghouse organization, which can then adjudicate accounting between the corresponding retail store owners and coupon sponsors by the amount of the discounts indicated in the log files. A substantial benefit of this electronic coupon embodiment is that it avoids the requirement to count paper coupons in paper coupon clearinghouses, thereby mooting substantial expense. Any method for LM CS 40 to transmit a coupon identifications to POS CS 30 promptly; during the ongoing purchase transaction, provides the foregoing benefits. Thus, any mode of wireless or wired transmission from LM CS 40 to POS CS 30 enabling POS CS 30 to capture the coupon identifications is envisioned. These modes include WiFi, infrared, cellular and direct network connection via a local network.

Alternative Embodiments

Several alternative and currently less preferred embodiments exists.

Instead of an intelligent Y cable, there may be connected to the output of scanner 50 a CS having wireless transmission capability, and one or both of the LM CS 40 and POS CS 50, and even CM CS 10, may receive wirelessly the data scanned by scanner 50. Again, preferably, the CS connected to the output of scanner 50 is configured to filter data in the manner described above for the Y cable.

Moreover, the devices that the customer and the store clerk use to input and output data may vary. For example, the consumer may use their cellular telephone to communicate over a variety of standards to input data, such as codes, into LM CS 40, instead of using a keypad or scanner 50. For example, LM CS may include a monitor to display voucher, triggered telephone code, or coupon information, to the customer.

In one alternative, the customer's cellular telephone (or wireless personal digital assistant) includes a built in scanner. The consumer scans product identifications of products the consumer intends to purchase and optionally also scans a voucher, and then brings those items to the POS and downloads the pre scanned information to either scanner 50, the CS associated with intelligent Y cable, or to LM CS 40 and POS CS 50. An advantage of this process is that the customer may also use their device to determine what incentives to expect before reaching checkout, while making purchase decisions. The customer may do so by communicating wirelessly with a database specifying discounts based upon the voucher or code stored in the consumer's cellular telephone.

In a less preferred invention, instead of filtering being performed by an intelligent Y cable, POS CS 30 is modified so that an error code generated by receipt of a scanned bar code not recognizable by POS CS 30 does not result in POS CS 30 hanging in all error state. This can be by either implementing an error handling routine in POS CS 30 that returns POS CS 30 to a state where it awaits data from scanner 50, or by reprogramming POS CS 30 to recognize and take no action processing data association with codes used by LM CS 40 for vouchers.

Methods not Requiring Time Correlation

The first class of implementations do not require time correlation between receipt in LM CS 40 of voucher ID and product ID as a prerequisite for printing a coupon. One such method involves first triggering, in response to reading a Product ID, print on LM CS 40's printer a voucher with a voucher ID number and a corresponding bar code. LM CS 40 stores the corresponding bar code in memory in association with a coupon for a product. The customer would then have to take the printed voucher printed by LM CS 40, and have it scanned by a scanner associated with both POS CS 30 and LM CS 40, or by a scanner associated only with LM CS 40. The voucher ID would be recognized in LM CS 40 and trigger the print of a coupon. That coupon for example could be a coupon requiring purchase a product competing with the purchased product (such as Coke for Pepsi soda or Marlboro for Camel cigarettes). This method does not require time correlation. Hence, it is simpler to implement. However, it cannot limit print of a coupon to a time period in which the IDs for both the voucher and the product for which the associated coupon provides a benefit are scanned.

A second method involves the consumer dialing a number to connect to LM CS 40 or CM CS 10 and optionally entering a specified PIN encoding at least an identification of the retail store or LM CS 40, in order to obtain coupons. The responding CS would then send a text message notifying the consumer of coupons available that week to that consumer, or provide to that consumer a second PIN to enter into LM CS 40 alpha key pad to which the LM CS 40 would respond by printing the specified coupons. Preferably, the second PIN would be part or all of the customer's cell phone number (for example the last 4 digits of the customer's cell phone number) or otherwise uniquely to the corresponding retail store encode the customer's cell phone number. As a result the LM CS 40 and/or CM CS 10 could obtain a CID specific to that consumer and retail store of LM CS. That CID could also be used to comply with age limitation laws. For example, the store clerk could be instructed to determine if the customer was of legal age, and if so, to then enter a "dummy" product ID into scanner 50 indicating whether the consumer was of age and ring up a zero cost transaction, and the LM CS 40 would capture that transaction information from the intelligent Y cable, including the "dummy" product ID indicating whether the customer was of legal age. Alternatively, the text message may instruct the customer to enter some other data into the alpha pad on the LM CS 40 in order to obtain coupons. Alternatively, the customer's cell telephone number or other data the LM CS 40 needs in order to print coupons for the customer, may be transmitted by the customer from the customer's cell phone to the LM CS 40. This is in implementations where the LM CS 40 includes a built in cell telephone card and telephone number. Alternatively, such transmission could be via WiFI or blue tooth connection or similar wireless standards.

In another method, the user calls a specified telephone number (for the CM CS 10 or the LM CS 40) and then receives a code corresponding to a promotional program. That code was previously sent to and stored in LM CS 40 (say, during a weekly update), from the CM CS 10. The customer must enter that code to obtain the coupon. Two drawbacks to this system are relatively low security and that the LM CS 40 does not thereby obtain a CID (such as a cell number) for the customer.

In another method, the user receives a notification (for example by cell phone text message or verbally from the store clerk, or via a display visible to the customer provided by the LM CS 40) of what promotions the user is entitled to if the user enters their CID (cell number or portion thereof) on the alpha keypad of LM CS 40. This mode has two benefits. First, LM CS 40 can read and store a CID, and in addition, it can associate product IDs of purchased products with that CID occurring within a specified time period, such as 1 minute. Thus, use of a CID/cell number provides the marketing CSs the ability to obtain a substitute for purchase history, time correlation of scanned product identifications. Second, since a cell telephone number ID is required to obtain coupons, fraud is substantially reduced.

Related Credit Card Processing Using LM CS 40

LM CS 40 may also have a credit card reader interface so that the built in cell telephone card can perform credit card authorization telephone calls. Some inventive methods include features relating to credit card authorization and using the customer's cell telephone number as a CID, as noted below.

LM CS 40 may be used in a manner that induces retail store owners and banks and credit card companies. These revolve around the LM CS 40 having a built in cell telephone communication capability to make network connections. In preferred embodiments, cellular telephone transmission between LM CS 40 and CM CS 10 only occurs at off hours, at night or when the corresponding retail store is closed or typically slow in sales.

One option is to offer the merchants a hookup to the cell telephone to dial and perform their credit card authorizations of transactions. This option would be desirable for merchants that do not want the additional expense and infrastructure support costs for telephone lines dedicated for credit card transactions. In this option, LM CS 40 is equipped with a plug and interface for accepting the standard credit card reader device, enabling the retail store owner to perform authorization (credit card and bank card) via the LM CS 40's cellular telephone card.

Another option provides customers an incentive to use their credit cards, which in turn may be used to solicit marketing dollars from credit card companies. In addition, credit card authorization processing through LM CS 40 enables it to capture credit card number data, another source of CID, in addition to cell telephone number CIDs. That enables the following additional possibilities.

Since the LM CS sees cell telephone number, credit card number data, and scanned product ID data in a time correlated fashion, LM CS 40 may associate all of that data together to provide purchase records without performing time correlation processing. LM CS 40 would then receive as input and log for example, at least some of cell number, credit card number, product ID, date/time, retail store ID, checkout lane. That information may be used for purchase history based targeted marketing and for its inherent value in analyzing convenience store sales.

The specific embodiments herein above are only exemplary, and the inventors rights should not be limited to those embodiments. The broad inventive concepts for which protection is sought are defined by the appended claims.

The invention claimed is:

1. A system for outputting product information data, comprising:
    a LM CS, said LM CS including: a LM CS central processing unit for processing instructions and data; a LM CS memory for storing data;
    at least one LM CS input for receiving identification codes; and at least one LM CS output for outputting identification codes;
    wherein said LM CS memory stores data specifying a correlation time;
    wherein said LM CS is configured to output product information data including a first product information ID code to said at least one LM CS output in response to receipt via said at least one LM CS input of a first voucher ID code and a first product ID code, only if, said LM CS receives said first voucher identification code via said at least one LM CS input and said first product identification code via said at least one LM CS input within said correlation time of one another;
    wherein said product information data is coupon data; wherein said LM CS is configured to output coupon data including a first coupon identification code to said at least one LM CS output in response to receipt via said at least one LM CS input of a first voucher identification code and a first product identification code, only if, said LM CS receives said first voucher identification code via said at least one LM CS input and said first product identification code via said at least one LM CS input within said correlation time of one another;
    wherein said at least one LM CS input for receiving identification codes comprises a scanner for reading bar codes;
    an intelligent data router containing circuitry configured to transmit all scanned bar code data scanned by said scanner corresponding to identification codes along a first data communication path coupled to said at least one LM CS input and selectively transmitting scanned bar code data along a second data communication path; and
    wherein said circuitry blocks transmission of voucher identification codes along said second data communication path.

2. A system for outputting coupon data, comprising:
    a LM CS, said LM CS including a LM CS central processing unit for processing instructions and data;
    a LM CS memory for storing data;
    at least one LM CS input for receiving identification codes;
    at least one LM CS output for outputting identification codes;
    a POS CS;
    a bar code scanner for scanning bar codes comprising product identification data; wherein said product identification data is coupon data; wherein said LM CS is configured to output coupon data including a first coupon identification code to said at least one LM CS output in response to receipt via said at least one LM CS input of a first voucher identification code and a first product identification code, only if, said LM CS receives said first voucher identification code via said at least one LM CS input and said first product identification code via said at least one LM CS input within said correlation time of one another; and
    an intelligent data router containing circuitry configured to transmit all scanned bar code data scanned by said bar code scanner corresponding to identification codes along a first data communication path coupled to said at least one LM CS input and selectively transmitting scanned bar code data along a second data communication path coupled to said POS CS, wherein said circuitry blocks transmission of voucher identification codes along said second data communication path.

3. The system of claim 1:
wherein said product information data is coupon data; and
wherein said LM CS is configured to output coupon data including a first coupon identification code to said at least one LM CS output in response to receipt via said at least one LM CS input of a first voucher identification code and a first product identification code, only if,
said LM CS receives said first voucher identification code via said at least one LM CS input and said first product identification code via said at least one LM CS input within said correlation time of one another.

4. The system of claim 3 wherein said at least one LM CS input for receiving identification codes comprises a scanner for reading bar codes.

5. The system of claim 4 further comprising an intelligent data router containing circuitry configured to transmit all scanned bar code data scanned by said scanner corresponding to identification codes along a first data communication path coupled to said at least one LM CS input and selectively transmitting scanned bar code data along a second data communication path.

6. The system of claim 5 wherein said circuitry blocks transmission of voucher identification codes along said second data communication path.

7. The system of claim 1 wherein said intelligent router forms part of an intelligent Y cable connecting said scanner to said LM CS.

8. The system of claim 1 wherein said at least one LM CS input for receiving identification codes comprises a key pad having numerals 0 through 9 for entering voucher identification codes in decimal format.

9. The system of claim 8 wherein said at least one LM CS input for receiving identification codes comprises a scanner.

10. The system of claim 1: wherein said at least one LM CS output comprises a printer; wherein said printer is configured to print a coupon containing a bar code specifying said first coupon identification code in response to receipt by said printer of coupon data including said first coupon identification code.

11. The system of claim 1: wherein said at least one LM CS output comprises at least one of a printer, a monitor, and a wireless transmitter; and wherein said at least one of said printer, said monitor; and said wireless transmitter are configured to output at least one of machine and human readable versions of said first coupon identification code.

12. The system of claim 1 wherein said coupon data including said first coupon identification code output to said at least one LM CS output includes identification of at least one product for which a coupon having said first coupon identification code can be redeemed.

13. The system of claim 1 wherein said correlation time is between 30 seconds and 2 minutes.

14. The system of claim 2 wherein said circuitry blocks transmission of voucher identification codes along said second data communication path.

* * * * *